(12) United States Patent
Helms et al.

(10) Patent No.: US 7,602,820 B2
(45) Date of Patent: Oct. 13, 2009

(54) APPARATUS AND METHODS FOR MULTI-STAGE MULTIPLEXING IN A NETWORK

(75) Inventors: William L. Helms, Longmont, CO (US); Paul D. Brooks, Weddington, NC (US)

(73) Assignee: Time Warner Cable Inc., New York, NY (US)

( * ) Notice: Subject to any disclaimer, the term of this patent is extended or adjusted under 35 U.S.C. 154(b) by 577 days.

(21) Appl. No.: 11/048,334

(22) Filed: Feb. 1, 2005

(65) Prior Publication Data

US 2006/0171423 A1    Aug. 3, 2006

(51) Int. Cl.
H04J 3/04 (2006.01)
H04J 3/16 (2006.01)
H04J 3/22 (2006.01)
H04J 3/18 (2006.01)
H04J 3/02 (2006.01)

(52) U.S. Cl. .................. 370/535; 370/465; 370/477; 370/539

(58) Field of Classification Search .................. 370/535, 370/537, 538, 539, 465, 477, 468
See application file for complete search history.

(56) References Cited

U.S. PATENT DOCUMENTS

| | | | |
|---|---|---|---|
| 5,208,692 A * | 5/1993 | McMahon | .................. 398/48 |
| 5,682,195 A | 10/1997 | Hendricks et al. | |
| 5,708,664 A | 1/1998 | Budge et al. | |
| 5,862,140 A | 1/1999 | Shen | |
| 5,956,088 A | 9/1999 | Shen | |
| 6,005,620 A | 12/1999 | Yang | |
| 6,038,256 A | 3/2000 | Linzer | |
| 6,052,384 A | 4/2000 | Huang | |
| 6,192,083 B1 | 2/2001 | Linzer | |
| 6,219,358 B1 | 4/2001 | Pinder et al. | |
| 6,259,733 B1 | 7/2001 | Kaye | |
| 6,285,716 B1 | 9/2001 | Knee et al. | |
| 6,577,682 B1 | 6/2003 | Brightwell et al. | |
| 6,674,804 B1 | 1/2004 | Eshet | |
| 6,785,558 B1 * | 8/2004 | Stratford et al. | .............. 455/561 |
| 6,792,045 B2 | 9/2004 | Matsumura et al. | |
| 6,795,506 B1 * | 9/2004 | Zhang et al. | ........... 375/240.26 |
| 6,813,270 B1 * | 11/2004 | Oz et al. | ..................... 370/394 |
| 6,894,973 B1 | 5/2005 | Mishra | |
| 6,909,726 B1 | 6/2005 | Sheeran | |
| 6,937,619 B1 | 8/2005 | Strasman | |
| 6,959,042 B1 | 10/2005 | Liu | |
| 6,963,544 B1 | 11/2005 | Balachandran | |
| 7,009,997 B2 | 3/2006 | Huang | |
| 7,016,337 B1 | 3/2006 | Wu | |
| 7,058,087 B1 * | 6/2006 | Oz et al. | ..................... 370/486 |
| 7,068,724 B1 | 6/2006 | Hamilton | |

(Continued)

*Primary Examiner*—Daniel J. Ryman
*Assistant Examiner*—Cassandra Decker
(74) *Attorney, Agent, or Firm*—Gazdzinski & Associates, PC

(57) ABSTRACT

Methods and apparatus for performing multiplexing of video or other content (e.g., programs) within a network using feedback from a subsequent digital program insertion stage, and/or feed-forward information from a prior multiplexing stage. In one embodiment, the network comprises a hybrid fiber coax (HFC) cable network having headend and hub-based statistical multiplexing stages, and communication between the two stages is used to improve the visual quality performance and bandwidth utilization of the output multi-program stream during conditions where downstream content is inserted into the transport stream. Business methods associated with the various multiplexing features described above are also disclosed.

19 Claims, 10 Drawing Sheets

U.S. PATENT DOCUMENTS

| | | |
|---|---|---|
| 7,130,310 B2 * | 10/2006 | Itawaki et al. ............... 370/465 |
| 7,162,531 B2 | 1/2007 | Paz |
| 7,173,947 B1 | 2/2007 | Ramakrishnan |
| 7,292,602 B1 | 11/2007 | Liu |
| 7,333,515 B1 | 2/2008 | Ramakrishnan |
| 2001/0055336 A1 | 12/2001 | Krause et al. |
| 2002/0059619 A1 | 5/2002 | Lebar |
| 2002/0085584 A1 | 7/2002 | Itawaki et al. |
| 2003/0007516 A1 * | 1/2003 | Abramov et al. ............ 370/535 |
| 2003/0056217 A1 | 3/2003 | Brooks |
| 2003/0083054 A1 * | 5/2003 | Francesca et al. ........... 455/418 |
| 2003/0217362 A1 * | 11/2003 | Summers et al. .............. 725/63 |
| 2003/0217365 A1 | 11/2003 | Caputo |
| 2004/0090996 A1 * | 5/2004 | Wu et al. .................... 370/535 |
| 2004/0163129 A1 * | 8/2004 | Chapman et al. ............ 725/126 |
| 2005/0289618 A1 | 12/2005 | Hardin |
| 2006/0067362 A1 * | 3/2006 | Ramakrishnan ............. 370/468 |
| 2006/0130113 A1 | 6/2006 | Boulder |

\* cited by examiner

APPARATUS AND METHODS FOR MULTI-STAGE MULTIPLEXING IN A NETWORK

BACKGROUND OF THE INVENTION

1. Field of the Invention

The invention relates generally to the fields of statistical multiplexing and distribution of content such as e.g., digital video. In one exemplary aspect, the invention relates to improving the performance of a video multiplexer/encoder in a digital cable network by using information from a previous or a subsequent multiplexing or program insertion stage.

2. Description of Related Technology

In a conventional digital television network, digital programming is usually collected at a central location, assembled in multiple transport streams and transported to other intermediate locations in the network for further downstream transportation to consumer premises equipment (CPE). These intermediate locations may alter the aggregated program multiplex received from the central location by replacing or changing the rate associated with programs in the original multiplex. For example, in a coaxial cable network, a cable operator can choose to insert local programming or advertisements at a hub location, and modify the aggregated programs received from a headend before the signal is sent downstream to the subscriber premises or other distribution nodes. The replacement programming may be available at the intermediate location in uncompressed (e.g., analog) or pre-compressed (e.g., MPEG-2 transport stream) format. In the recent years, more and more central locations (e.g., cable headends) have begun using statistical multiplexing techniques to efficiently create the centrally aggregated program multiplexes.

As is well known, statistical multiplexing (colloquially referred to as "stat mux") is a technique used to efficiently pack multiple programs within a transport stream. This technique relies on the principle that the instantaneous bandwidth required to transmit a given program fluctuates over time, typically based on the ease of compression of the video content. This makes bandwidth-efficient transmission of multiple programs possible as a multiplex by sharing the allocated bitrate. Because the bitrate peaks of separate program streams do not occur simultaneously, a group of programmers can share an allocated bitrate that is smaller than the sum of the bitrate peaks of the program streams carried. Furthermore, the bitrate contribution each individual program stream is typically controlled (commonly referred to as rate shaped) to provide both a safety factor and even greater efficiencies. Conventional approaches to statistical multiplexing have recognized that the greater the number of programs in a multiplex (i.e., "pool size"), the better the chances of using bandwidth efficiently.

While the use of statistical multiplexing is beneficial in many aspects, including for example reduced storage and transportation costs, it creates a new set of design challenges that must be adequately addressed. For example, when the program streams sent from the headend to a hub are statistically multiplexed together, local insertion of material presents additional considerations and challenges for maximization of the multiplex efficiency.

When a statistically multiplexed digital program or content is removed from the multiplex, and another digital program is inserted in its place, the instantaneous bandwidth requirements of the two programs are almost never identical. If the instantaneous bandwidth of the original program is less than the instantaneous bandwidth required by the program to be inserted, the program to be inserted has to be quantized to a lower rate, resulting in a loss in quality. However, when the instantaneous bandwidth of the original program is greater than that of the program to be inserted, the quality of a previously encoded replacement program cannot be improved any more than what is already present. Therefore, replacement of a statistically multiplexed program generally results in a reduction in quality of the inserted program. In some conventional systems, this quality problem is addressed by providing unused bandwidth in the original multiplex to accommodate for the differences in instantaneous bandwidths.

A variety of approaches to statistical multiplexing and communication between encoding stages are in evidence under the prior art. For example, U.S. Pat. No. 5,708,664 to Budge, et al. issued Jan. 13, 1998 entitled "Statistical multiplexing" discloses a transmitter for transmitting a plurality of digital signals through a plurality of channels, the channels having a predetermined total allocated bitrate. The transmitter includes a plurality of encoders each associated with one channel, a multiplexer for receiving the encoded digital signals and for transmitting the encoded signals as a stream of data, and operable for adjusting the distribution of the bitrate allocation between and among the encoded signals, and a processing device for providing an indication of a target quality and an actual quality for each channel and for causing the multiplexer to repeatedly adjust the distribution of the bitrate allocation in response to differences between the indicated actual quality and the indicated target quality for each channel so as to equalize differences between the actual and target quality across at least some of the channels. By grouping encoders together in "statistical multiplex groups", and making real time decisions about the bitrate requirements for those encoders, bitrate can be allocated to maximize picture quality for the group. For a variety of different picture sources in a statistical multiplex group, to achieve a target picture quality the bitrate requirements of each will vary with coding difficulty. Thus, a channel within the statistical multiplex group that is experiencing little difficulty in encoding its picture can free bits to channels that are having greater difficulty. The effect is to smooth the picture quality and subjectively improve it.

U.S. Pat. No. 6,219,358 to Pinder, et al. issued Apr. 17, 2001 entitled "Adaptive rate control for insertion of data into arbitrary bit rate data streams" discloses apparatus wherein the rate of insertion of data, such as MPEG table packets, into an outgoing bit stream is varied by a packet handler. The packet handler, which is located in a modulator in a cable television system headend, comprises control logic and a packet router. The actual insertion rate of the outgoing data is based on the bit stream's available capacity for insertion of data and the desired insertion rate of the data. When the available capacity for insertion equals or exceeds the desired insertion rate, the actual insertion rate equals the desired insertion rate. When the available capacity for insertion is less than the desired insertion rate, the actual insertion rate is reduced from the desired insertion rate. The invention dynamically determines the available capacity for insertion and adjusts the actual insertion rate.

U.S. Pat. No. 6,285,716 to Knee, et al. issued Sep. 4, 2001 entitled "Video compression" discloses a method to manipulate an MPEG-2 or other compressed video stream as separate information bus and coefficient streams. The information bus stream contains motion vector information but also information derived from a previous decoding operation for use in a subsequent coding operation. Processing in the coefficient domain enables bit rate conversion without decoding to the pixel level and also ostensibly simplifies the combination of MPEG layers.

U.S. Pat. No. 6,577,682 to Brightwell, et al. issued Jun. 10, 2003 entitled "Video processing system also compressing coding decision data" discloses a method in which an MPEG2 decoded video signal is accompanied by a representation of the coding decisions to aid downstream re-encoding. The representation is MPEG compliant bit modified as an attempt to reduce the number of bits.

U.S. Pat. No. 6,792,045 to Matsumura, et al. issued Sep. 14, 2004 entitled "Image signal transcoder capable of bit stream transformation suppressing deterioration of picture quality" discloses An MPEG2 decoder portion decodes an input bit stream and outputs a digital decoded image while extracting coding information and supplying the same to a control portion. An MPEG2 encoder portion re-encodes the digital decoded image output from the MPEG2 decoder portion. Coding information supplied from the control portion is reflected on a coding parameter in re-encoding. Transcoding between the MPEG2 standard and the DV standard can also be executed by arranging a decoder or an encoder corresponding to the DV standard in place of either the MPEG2 decoder portion or the MPEG2 encoder portion.

U.S. Pat. No. 6,795,506 to Zhang, et al. issued Sep. 21, 2004 entitled "Methods and apparatus for efficient scheduling and multiplexing" discloses techniques and mechanisms for scheduling and multiplexing compressed bitstreams. A compressed bitstream includes bit rate information describing the bit rate of video data. The bit rate information is used to ostensibly improve the scheduling and multiplexing efficiency of compressed bitstreams. Compressed video data can be transmitted over communication channels at bit rates that comply with available channel bandwidth.

United States Patent Publication 20010055336 to Krause, et al. published Dec. 27, 2001 and entitled "Compressed-Video Re-encoder System For Modifying The Compression Ratio Of Digitally Encoded Video Programs" discloses a compressed video decoder/encoder (re-encoder) system for varying the compression ratio of a compressed video program. The composite re-encoder system implements tightly coupled elements for decoding and encoding compressed video data implementing techniques of header forwarding and utilizing an architecture in which a shared motion compensator supports both decoding and encoding operations simultaneously. The re-encoder system may be introduced in a statistical multiplexer for generating a compressed video data stream multiplex suitable for use in cable distribution and other video distribution systems.

United States Patent Publication No. 20020085584 to Itawaki, et al. published Jul. 4, 2002 entitled "Statistical multiplex system, statistical multiplex controller and method of statistical multiplex" discloses a statistical multiplex system, a statistical multiplex controller and a method of statistical multiplex, which can assign bit rates to program data and auxiliary data for purposes of image quality. A statistical multiplex system is provided with: a plurality of image encoders for encoding a plurality of program data; an information encoder for encoding the auxiliary data; a multiplexing apparatus for multiplexing output thereof, and a statistical multiplex controller for controlling each of the image encoders and the information encoder. The statistical multiplex controller is made to set the bit rate to be assigned to the information encoder first, and to assign the remaining bit rates to each of the image encoders.

It is evident that while the prior art has in general recognized the utility of creating at one video encoding stage information helpful to a next video encoding stage (and communicating such information to the next stage), it lacks effective and efficient methods and apparatus for the distribution of statistically multiplexed video programs in a headend/hub distribution system, especially in the context of local insertion of content via a multi-stage multiplexer architecture.

Accordingly, it would be most desirable to implement methods and apparatus that provide a "first" (i.e., earlier or upstream) stage multiplexer with information related to programs/content that will be inserted at a later stage), so that the first stage multiplexer can use the information to create a program multiplex amenable or adapted to a subsequent digital program insertion. Similarly, it is desirable to implement methods and apparatus that provide a "second" (i.e., later or downstream) stage multiplexer with information related to the program/content present in the initial multiplex created by the first stage so that the second stage multiplexer can efficiently create the output multiplex. Efficient multiplexing of content would be provided, while taking into account subsequent any instantaneous bandwidth constraints imposed by a prior or subsequent program insertion/removal or similar operation.

Furthermore, since it is typical for statistical multiplexers to make use of a wide range of statistical parameters, with each parameter having a broad spectrum of values, such improved methods and apparatus would also ideally include a provision for the various multiplexing stages to exchange capability information with each other.

SUMMARY OF THE INVENTION

The present invention addresses the foregoing needs by providing, in various embodiments, methods and apparatus for statistical multiplexing of digital programs using information between two or more multiplexing stages, including where one or more programs are replaced with local content.

In a first aspect of the invention, an improved content distribution system is disclosed. In one embodiment, the system is adapted for the transmission of a plurality of programs over a cable network, and comprises: a first statistical multiplexing apparatus associated with a first entity within the network; and a second statistical multiplexing apparatus associated with a second entity within the network, the second apparatus receiving a multiplex of the programs generated by the first apparatus. The first and second apparatus communicate through at least one of a feed-back or feed-forward signal path, the communication comprising information useful in configuring the operation of one of the first or second apparatus in response to actions taken at the other of the first or second apparatus.

In a second aspect of the invention, improved headend multiplexing apparatus is disclosed. In one embodiment, the apparatus is adapted for the transmission of a plurality of content elements over a cable network, and comprises: first multiplexing apparatus adapted to receive the plurality of content elements from one or more sources, and create at least one output multiplex based thereon; a process in communication with the first multiplexing apparatus and adapted to control at least one aspect of the first apparatus in the creation of the output multiplex; and a data interface adapted to communicate data between the headend apparatus and a second multiplexing apparatus within the network, the data comprising information which allows for bandwidth or rate shaping applied by at least one of the first and second multiplexing apparatus.

In a third aspect of the invention, improved network multiplexing apparatus is disclosed. In one embodiment, the apparatus is adapted for the transmission of content elements over a cable network, and comprises: first multiplexing apparatus adapted to receive a first multiplex generated by a second multiplexing apparatus upstream of the first apparatus, the first multiplex comprising a plurality of content elements; a process in communication with the first apparatus and adapted to control at least one of (i) the insertion of additional content elements into the first multiplex, and (ii) removal of one or more of the plurality of content elements within the first multiplex; and a data interface adapted to communicate data between the network multiplexing apparatus and the second multiplexing apparatus, the data comprising information which allows for bandwidth or rate shaping applied by at least one of the first and second multiplexing apparatus.

In a fourth aspect of the invention, a method of providing a plurality of programs via a cable network having a first statistical multiplexing apparatus and a second statistical multiplexing apparatus is disclosed. In one embodiment, the second apparatus receives a multiplex of the programs generated by the first apparatus, and the method comprises communicating at least one of a feed-back or feed-forward signal between the first and second apparatus, the signal comprising information useful in configuring the operation of one of the first or second apparatus in response to actions taken at the other of the first or second apparatus.

In a fifth aspect of the invention, a method of providing advertising or promotions over a cable network is disclosed. In one embodiment, the network has multiple multiplexing stages, and the method comprises: multiplexing a plurality of content elements together at a first multiplexing stage within the network to form a first multiplex; and providing feed-back information to the first stage from a second multiplexing stage within the network, the second stage being downstream in a transmission path from the first stage. The feed-back information relates to one or more advertising or promotion content elements to be inserted into the first multiplex at the second stage in order to form a second multiplex; and the first multiplexing stage utilizes the feed-back information to adjust at least one parameter associated with its operation in order to accommodate the one or more inserted advertising or promotion content elements.

In a sixth aspect of the invention, a method of providing advertising or promotions over a cable network having multiple multiplexing stages is disclosed. In one embodiment, the method comprises: multiplexing a plurality of content elements together at a first multiplexing stage within the network to form a first multiplex; and providing feed-forward information from the first stage to a second multiplexing stage within the network, the second stage being downstream in a transmission path from the first stage and adapted to insert one or more advertising or promotion content elements into the first multiplex in order to form a second multiplex. The feed-forward information relates to one or more parameters of the plurality of content elements or first multiplex; and the second multiplexing stage utilizes the feed-forward information to adjust at least one parameter associated with its operation in order to accommodate the inserted one or more advertising or promotion content elements.

In a seventh aspect of the invention, a method of operating a content-based network having a plurality of multiplexing stages using a delay between the stages is disclosed. In one embodiment, the method comprises: receiving a plurality of content elements at a first of the plurality of stages; generating a multiplex based at least in part on the content elements; providing the multiplex to a second of the plurality of stages, the second stage being downstream from the first stage, the act of providing comprising introducing a delay; and providing data relating to the multiplex to the second stage at least contemporaneously with the expiration of the delay. The delay is applied uniformly to the aggregate multiplex bitstream and to all program streams that may need to be added to the multiplex. This allows "future looking" data about the bitrate needs of the streams in the multiplex (with an additional or substituted stream) to be provided to the second stage prior the act of adding or substituting the new stream. This future looking data allows the second stage to improve the quality of all rate shaping decisions.

In an eighth aspect of the invention, a method of operating a content-based network having a plurality of multiplexing stages is disclosed. In one embodiment, at least one of the stages comprises a distribution node servicing a CPE, and the method comprises: receiving a plurality of content elements at a first of the plurality of stages; generating a first multiplex based at least in part on the content elements; providing the first multiplex to the distribution node, the act of providing comprising introducing a delay; providing data relating to the first multiplex to the distribution node at least contemporaneously with the expiration of the delay; receiving at least one service request from the CPE at the distribution node; and generating a second multiplex at the distribution node substantially in response to the service request, the second multiplex being generated based at least in part on the data. Stream substitution facilitated by the time delay mechanism described above is applied to ordinary program streams based on program stream requests that are made through various CPE. In this manner, a "switched digital" broadcast is allowed to enjoy the advantages of statistical multiplexing heretofore not possible due to the real-time nature of the switched programming and also channel switching performance constraints.

In a ninth aspect of the invention, a method of doing business within a cable network having at least first and second multiplex stages is disclosed. In one embodiment, the method comprises: providing opportunities for content insertion within one or more designated zones of the network; accepting requests for the insertion; generating a first content multiplex at the first stage; and inserting content into the first multiplex within selected ones of the zones based at least in part on the requests; wherein the act of generating is based at least in part on information relating to the act of inserting.

In another embodiment, the method comprises providing opportunities for content insertion within one or more designated zones of the network; accepting requests for the insertion; generating a first content multiplex at the first stage; and inserting second content into the first multiplex within selected ones of the zones based at least in part on the requests; wherein the act of inserting comprises controlling at least one parameter associated with the inserted second content by adjusting at least one parameter associated with the act of generating.

BRIEF DESCRIPTION OF THE DRAWINGS

The above and other features and advantages of the present invention are hereinafter described in the following detailed description of illustrative embodiments to be read in conjunction with the accompanying drawings and figures, wherein like reference numerals are used to identify the same or similar system parts and/or method steps, and in which.

DETAILED DESCRIPTION OF THE INVENTION

Figure 1:
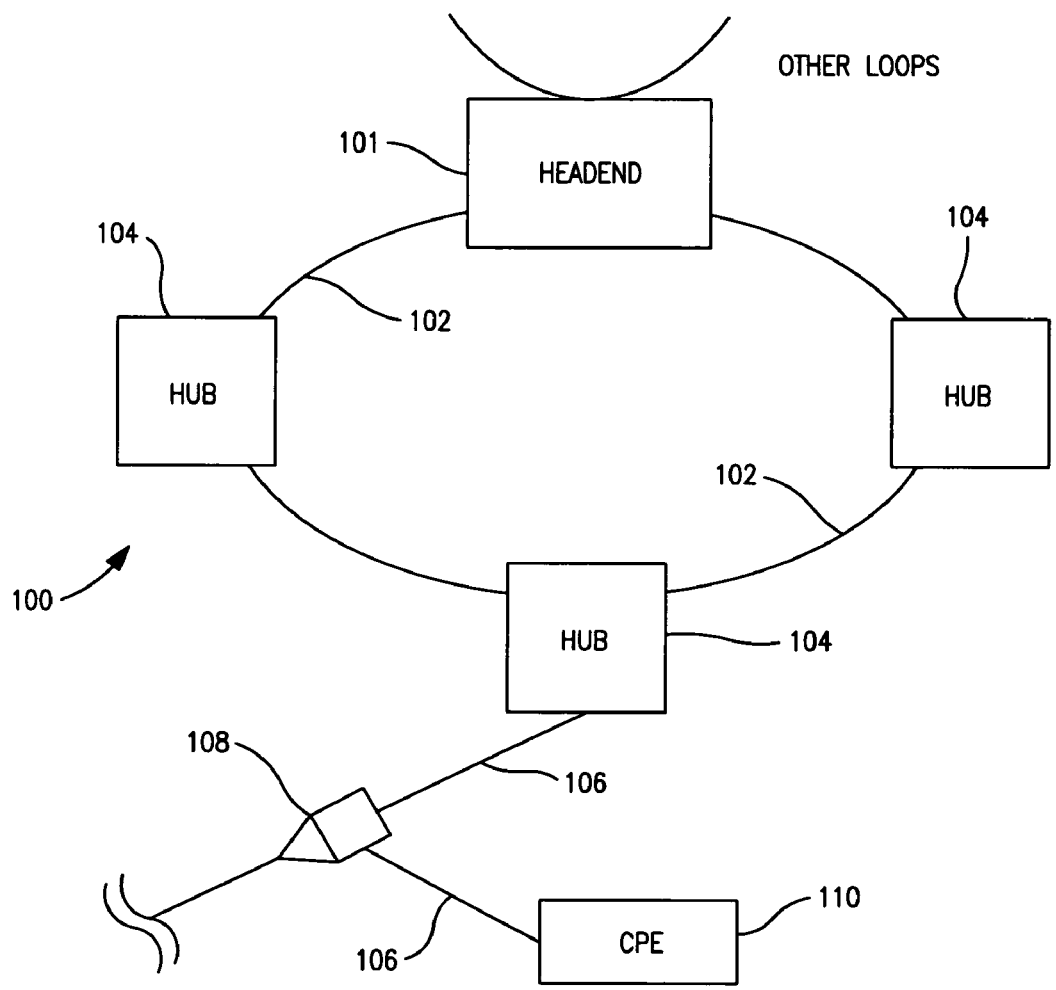
FIG. 1 is a functional block diagram illustrating one exemplary embodiment of HFC cable network architecture useful with the present invention.

Reference is now made to the drawings wherein like numerals refer to like parts throughout.

As used herein, the term "MSO" refers to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, PANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, 802.11, 802.15, 802.16 (WiMAX), ATM, X.25, Frame Relay, 3GPP, 3GPP2, WAP, SIP, UDP, FTP, RTP/RTCP, H.323, etc.).

As used herein, the term "QAM" refers generally to modulation schemes used for sending signals over coaxial cable or other networks. Such modulation scheme might use any constellation level (e.g. QAM16, QAM64, QAM256 etc.) depending on the details of a particular cable or other (e.g., satellite) network.

As used herein, the term "headend" refers generally to a networked system controlled by an operator (e.g., an MSO or Multiple Systems Operator) that distributes programming to MSO clientele using client devices. Such programming may include literally any information source/receiver including, inter alia, free-to-air TV channels, pay TV channels, interactive TV, and the Internet. DSTBs may literally take on any configuration, and can be retail devices meaning that consumers may or may not obtain their DSTBs from the MSO exclusively. Accordingly, it is anticipated that MSO networks may have client devices from multiple vendors, and these client devices will have widely varying hardware capabilities. Multiple regional headends may be in the same or different cities.

As used herein, the term "content" refers to audio, video, graphics files (in uncompressed or compressed format), icons, software, text files and scripts, data, binary files and other computer-usable data used to operate a client device and produce desired audio-visual effects on a client device for the viewer.

As used herein, the terms "client device" and "end user device" include, but are not limited to, personal computers (PCs) and minicomputers, whether desktop, laptop, or otherwise, set-top boxes such as the Motorola DCT2XXX/5XXX and Scientific Atlanta Explorer 2XXX/3XXX/4XXX/8XXX series digital devices, personal digital assistants (PDAs) such as the Apple Newton®, "Palm®" family of devices, handheld computers, personal communicators such as the Motorola Accompli devices, J2ME equipped devices, cellular telephones (including "smart phones"), wireless nodes, or literally any other device capable of interchanging data with a network.

Similarly, the terms "Consumer Premises Equipment (CPE)" and "host device" refer to any type of electronic equipment located within a consumer's or user's premises and connected to a network. The term "host device" refers generally to a terminal device that has access to digital television content via a satellite, cable, or terrestrial network. The host device functionality may be integrated into a digital television (DTV) set. The term "consumer premises equipment" (CPE) includes electronic equipment such as set-top boxes, televisions, Digital Video Recorders (DVR), gateway storage devices (Furnace), and ITV Personal Computers.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the term "computer program" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VOXML), and the like, as well as object-oriented environments such as the Common Object Request Broker Architecture (CORBA), Java™ (including J2ME, Java Beans, etc.) and the like.

As used herein, the term "server" refers to any computerized component, system or entity regardless of form, which is adapted to provide data, files, applications, content, or other services to one or more other devices or entities on a computer network.

As used herein, the term "legacy" refers to any component, system, process, or method which is prior to the most current generation, revision, or modification of such component, system, process, or method.

As used herein, the term "statistical" refers without limitation to any process, component or analytical framework based at least in part on one or more statistical, anecdotal or deterministic parameters. Such process, component or framework may be implemented for example using a posteriori data, via actual or effective a priori relationships or data, or otherwise.

Overview

The present invention provides, inter alia, apparatus and methods for enhancing the efficiency and capability of multiplexed network systems such as cable television networks with respect to various types of content carried thereon. Specifically, in one salient aspect, the present invention provides improved multiplexing apparatus and methods that allow such systems to dynamically compensate for content (e.g., advertisements, promotions, or other programs) that is inserted at a downstream network node such as a local hub.

In one variant, a "feed-back" approach is used wherein one or more downstream multiplexing processes communicate information back to their upstream multiplexing process(es) in order to permit the upstream process(es) to adjust one or more operational parameters (such as the bandwidth allocated to the content programs comprising the multiplex).

In another variant, a feed-forward approach is used wherein the upstream multiplexing process(es) provide information relating to the original multiplex to the downstream nodes (e.g., hubs) in order to provide an anticipatory control of the downstream multiplexing processes (such as, e.g., adjusting the parameters of the content to be inserted into the stream).

Various other configurations (including network topologies having three or more multiplexing stages), and new business models made possible by the aforementioned feed-back and feed-forward approaches, are also described.

DESCRIPTION OF EXEMPLARY EMBODIMENTS

Exemplary embodiments of the apparatus and methods of the present invention are now described in detail. While these exemplary embodiments are described in the context of the hybrid fiber coax (HFC) cable architecture having an multi-system operator (MSO), digital networking capability, and plurality of client devices/CPE, the general principles and advantages of the invention may be extended to other types of networks and architectures where the efficient allocation of larger-bandwidth programs or content is desired. Hence, the following description is merely exemplary in nature.

It will also be appreciated that while described generally in the context of a network providing service to a consumer (i.e., home) end user domain, the present invention may be readily adapted to other types of environments including, e.g., commercial/enterprise, and government/military applications. Myriad other applications are possible.

Furthermore, the terms "first" and "second", "upstream" and "downstream", and "earlier" and "later" as used herein with respect to certain embodiments connote only a relative relationship between two components or processes, and not any absolute placement within a network, architecture or logical process. For example, a first-stage multiplexer according to the invention may be separated from a second-stage multiplexer by one or more intermediary components (including other multiplexer/demultiplexer stages). Similarly, the first-stage multiplexer might refer to a stage in a reverse channel, wherein the second-stage multiplexer is closer to the signal destination (e.g., head end of a cable network). As yet another alternative, logical processes associated with a later or "downstream" stage may actually be performed before processing by an "upstream" or earlier stage. Hence, the present invention should in no way be considered limited to any particular architecture or relationship, the embodiments presented herein being merely exemplary of the broader concepts.

It is further noted that while described primarily in the context of 6 MHz RF channels, the present invention is applicable to literally any frequency/bandwidth, such as for example 8 MHz channels. Furthermore, as referenced above, the invention is in no way limited to traditional cable system frequencies (i.e., below 1 GHz), and in fact may be used with systems that operate above 1 GHz band in center frequency or bandwidth, to include without limitation so-called ultra-wideband systems.

Lastly, while described primarily in the context of a downstream "broadcast" paradigm, it will be understood that the various aspects of the present invention are equally applicable regardless of whether a given program is intended for broadcast or supplied via an on-demand (OD) or other such "user pull" service.

Many other permutations of the foregoing system components and communication methods may also be used consistent with the present invention, as will be recognized by those of ordinary skill in the field.

Bearer Network Architecture—

FIG. 1 illustrates an exemplary configuration of a multi-channel hub-based cable network architecture useful with the present invention. The illustrated network 100 comprises several components, including a central headend station 101, a fiber transport network 102, a plurality of hubs 104, and coaxial distribution network 106. The distribution network distributes signals from the hub(s) 104 to at least one consumer premises equipment 110 through at least one distribution node 108. As will be recognized, the illustrated network 100 represents only part of the digital video program system associated with a central headend 101; in practice, the headend 101 also provides television services to several other hubs connected by other fiber transport networks, not specifically shown in FIG. 1.

As discussed below with reference to FIGS. 1a and 1b, the headend 101 typically includes functional elements useful to create digital program streams for transportation over the fiber network 102. These include, but not limited to, integrated receiver decoders (IRDs), encoders (e.g., compression equipment), and multiplexers.

In a typical cable network, the first stage of statistical multiplexing is typically implemented at the headend location 101. At each hub 104, a second stage of statistical multiplexing is implemented wherein some programs received from the headend will be replaced by local programming, advertisements or other content, and sent for distribution to all or a subset of the CPE 110 connected downstream from the servicing hub 104.

Figure 1A:
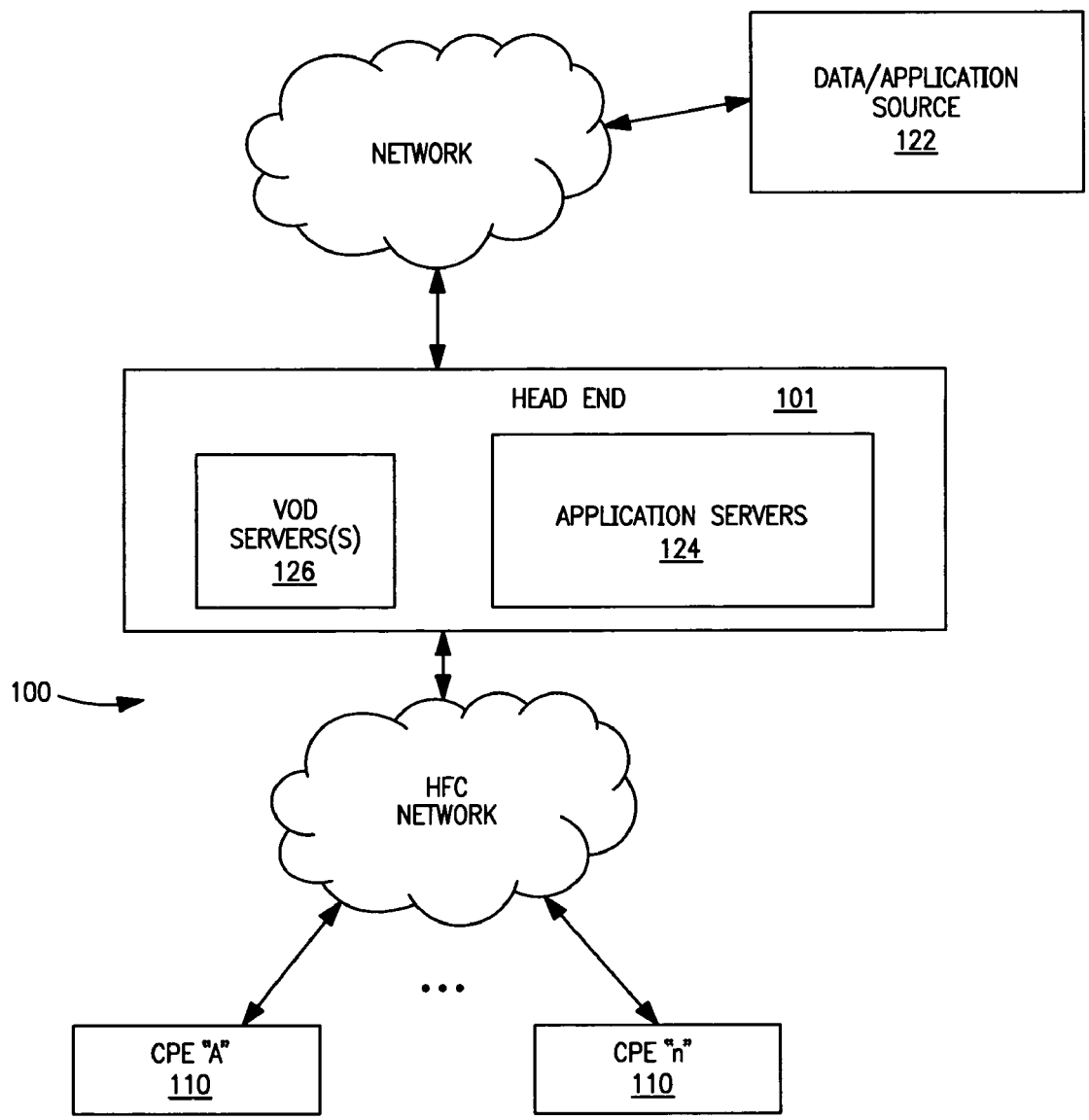
FIG. 1a is a functional block diagram illustrating the various data and application sources and severs utilized within the exemplary network of FIG. 1.

FIG. 1a illustrates the content-based aspects of the exemplary network configuration of FIG. 1. The various content-based components of the network 100 include (i) one or more data and application origination points 122; (ii) one or more application distribution servers 124; and (iii) one or more VOD servers 126. The distribution server(s) 124, VOD servers 126 and CPE(s) 110 are connected via various portions of the bearer (e.g., fiber and HFC) network. A simple architecture comprising one of each of the aforementioned components 122, 124, 126 is shown in FIG. 1a for simplicity, although it will be recognized that comparable architectures with multiple origination points, distribution servers, VOD servers, and/or CPE devices (as well as different network topologies) may be utilized consistent with the invention. For example, the headend architecture of FIG. 1b (described in greater detail below) may be used.

The application origination point 122 comprises any medium that allows an application (such as a VOD based application) to be transferred to a distribution server 124. This can include for example an application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 124 comprises a computer system where such applications can enter the network system. Distribution servers are well known in the networking arts, and accordingly not described further herein.

The VOD server 126 a computer system where on-demand content can be received from one or more data sources 122 and enter the network system. These servers may generate the content locally, or alternatively act as a gateway or intermediary from a distant source. The VOD server 126 includes the Session Resource Manager (SRM) functionality, and asks the Digital Network Control System (DNCS) for resources. The DNCS responds with negative or positive response to the request, and the VOD server implements the appropriate resource allocation logic, such as that described in co-owned U.S. patent application Ser. No. 10/881,979 filed Jun. 29, 2004 and entitled "METHOD AND APPARATUS FOR NETWORK BANDWIDTH ALLOCATION" incorporated herein by reference in its entirety, although other approaches and configurations may be used with equal success.

The CPE 110 includes any equipment in the "consumers' premises" (or other locations, whether local or remote to the distribution server 124) that can be accessed by a distribution server 124. Such CPE 110 comprises processors and associated computer memory adapted to store and run the downloaded or resident application, as well as receive the streamed in-band content. In the present context, at least a portion of the VOD application is typically downloaded to the CPE 110, wherein the latter executes the downloaded application(s)/ components, although it will be recognized that all of applications may conceivably be uploaded to the server, or alternatively transferred to another device, such as other networked CPE or the like.

Figure 1B:
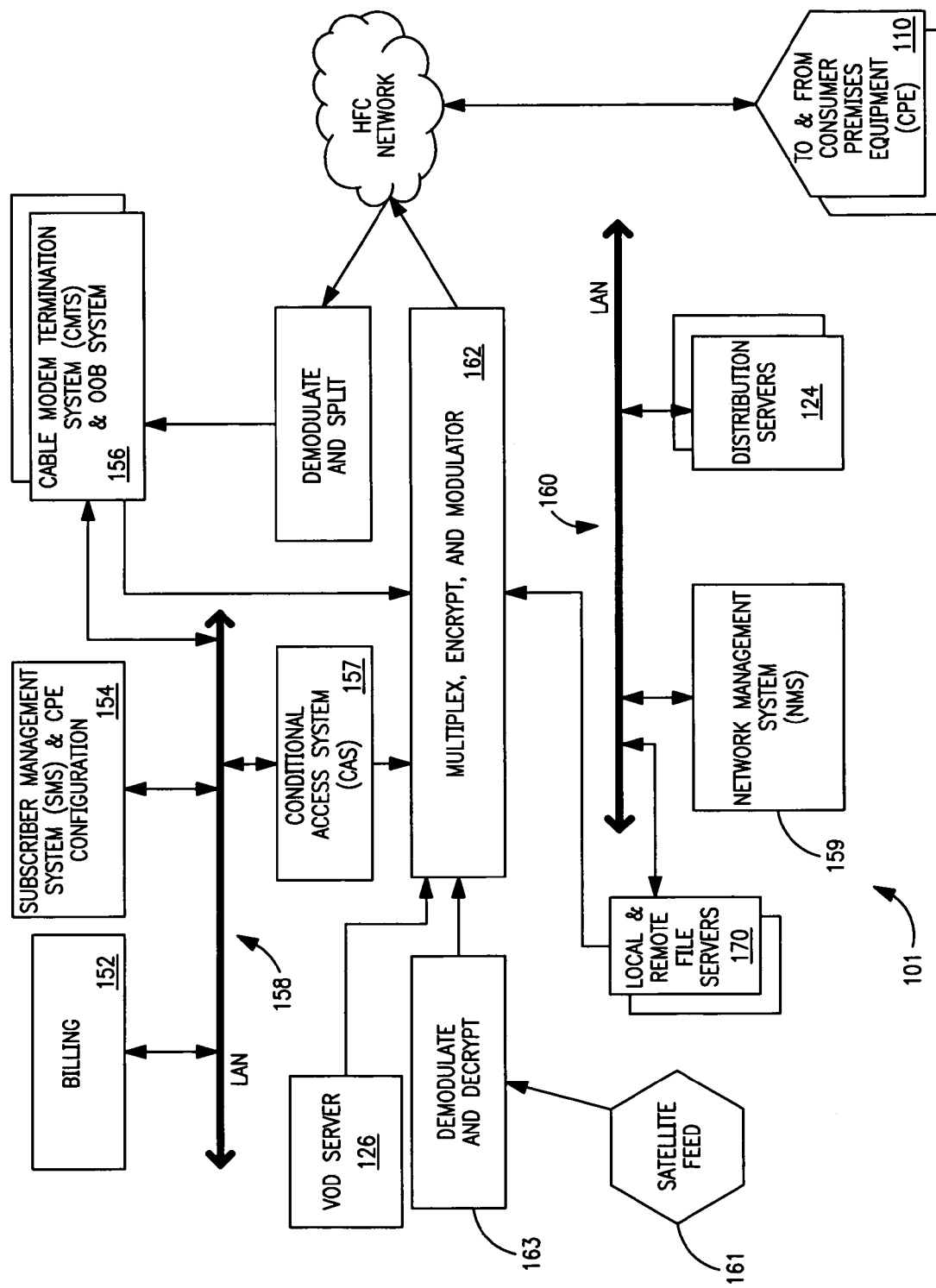
FIG. 1b is a functional block diagram illustrating one exemplary head-end configuration of the network of FIG. 1.

Referring now to FIG. 1b, one exemplary embodiment of a headend architecture useful with the present invention is described. As shown in FIG. 1b, the headend architecture 101 comprises typical headend components and services including billing module 152, subscriber management system (SMS) and CPE configuration management module 154, cable-modem termination system (CMTS) and OOB system 156, Conditional Access Sysytem 157, Network Management System (NMS)159, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the headend configuration depicted in FIG. 1b is high-level, conceptual architecture and that each MSO may have multiple headends deployed using custom architectures.

The architecture 101 of FIG. 1b further includes a multiplexer/encrypter/modulator (MEM) 162 coupled to the network 100 adapted to "condition" content for transmission over the network. The MEM 162 also comprises a first multiplexer stage, described in greater detail subsequently herein with respect to FIG. 3. In the present context, the distribution servers 124 are coupled to the LAN 160, which provides access to the MEM 162 and network 100 via one or more file servers 170. The VOD servers 126 are coupled to the LAN 160 as well, although other architectures may be employed (such as for example where the VOD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 101 to the CPE 110 ("downstream") are multiplexed together in the headend and sent to neighborhood hubs 104 of FIG. 1.

Content (e.g., audio, video, etc.) is provided in each downstream (in-band) channel associated with the relevant service group. To communicate with the headend, the CPE 110 uses the out-of-band (OOB) or DOCSIS channels and associated protocols. For example, the OCAP 1.0 specification provides for networking protocols both downstream and upstream.

In another embodiment, the network infrastructure includes one or more on-demand file or "carousel" functions. Specifically, the present invention contemplates that not only will more traditional movie (e.g., MPEG) data be allocated and delivered though the coordinated multi-stage multiplexing mechanisms described herein, but also data for interactive applications or other types of applications. In fact, it will be appreciated that any variable bit rate stream subject to lossy compression could benefit from the techniques of the present invention. For example, these techniques may be applied to digitized voice and music.

It will also be recognized that the multiple servers (content or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups. One exemplary multi-server architecture particularly useful with the present invention is described in co-pending and co-owned United States Patent Application Publication No. 20020059619 to Lebar published May 16, 2002 and entitled "Hybrid central/distributed VOD system with tiered content structure" which is incorporated herein by reference in its entirety.

Many other permutations of the foregoing system components and communication methods may also be used consistent with the present invention, as will be recognized by those of ordinary skill in the field.

Statistical Multiplexing Methods and Subsystem—

Figure 2:
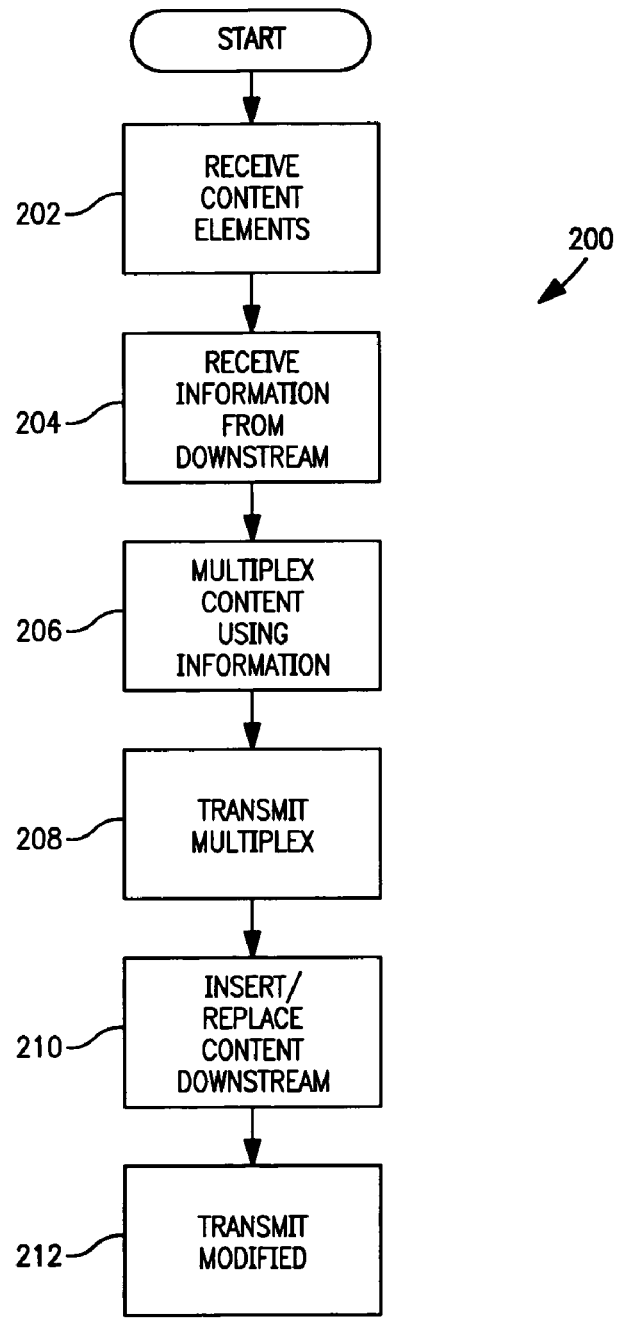
FIG. 2 is a logical flow diagram of an exemplary method of performing content multiplexing according to the present invention.
Figure 2A:
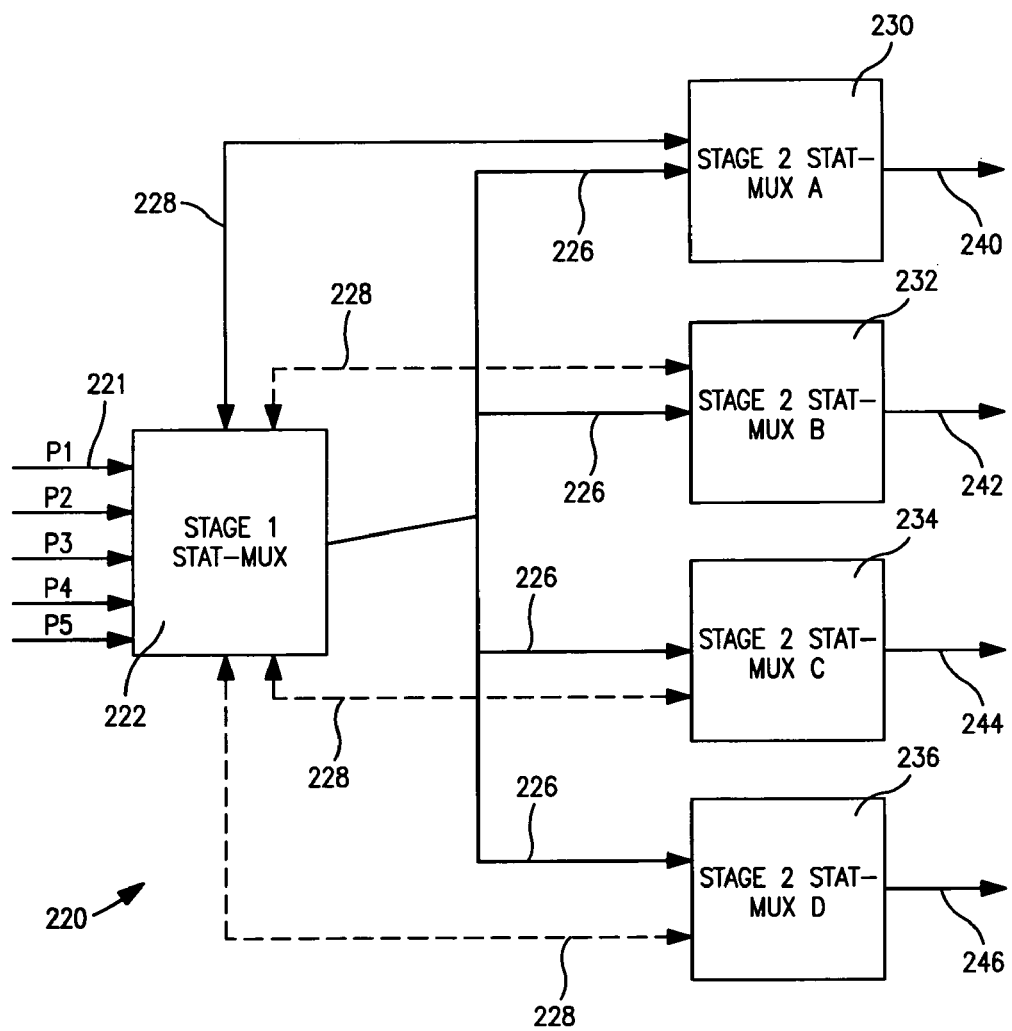
FIG. 2a is a functional block diagram illustrating one exemplary embodiment of a multi-stage (e.g., headend-hub) content distribution system according to the invention.
Figure 2B:
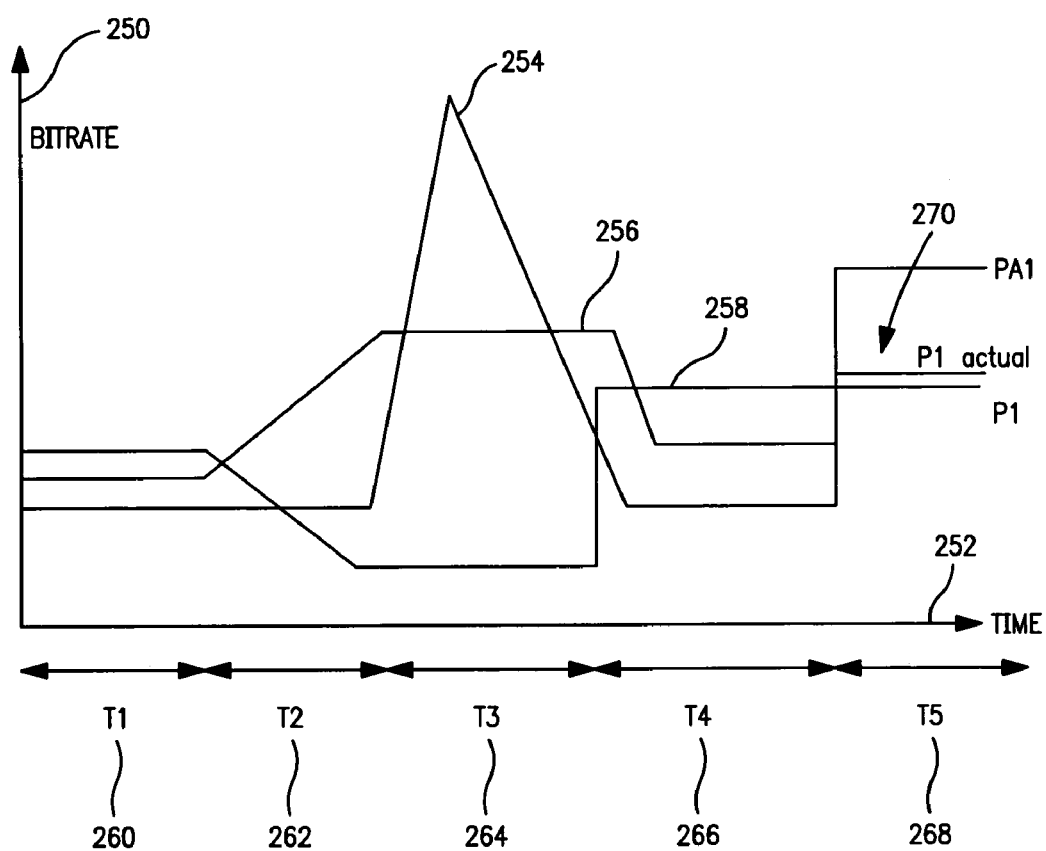
FIG. 2b is an graph illustrating how bitrates allocated to individual programs within a statistical multiplexer are utilized efficiently in an exemplary embodiment of the present invention (e.g., by spreading an increased bit rate requirement over multiple frames).
Figure 2C:
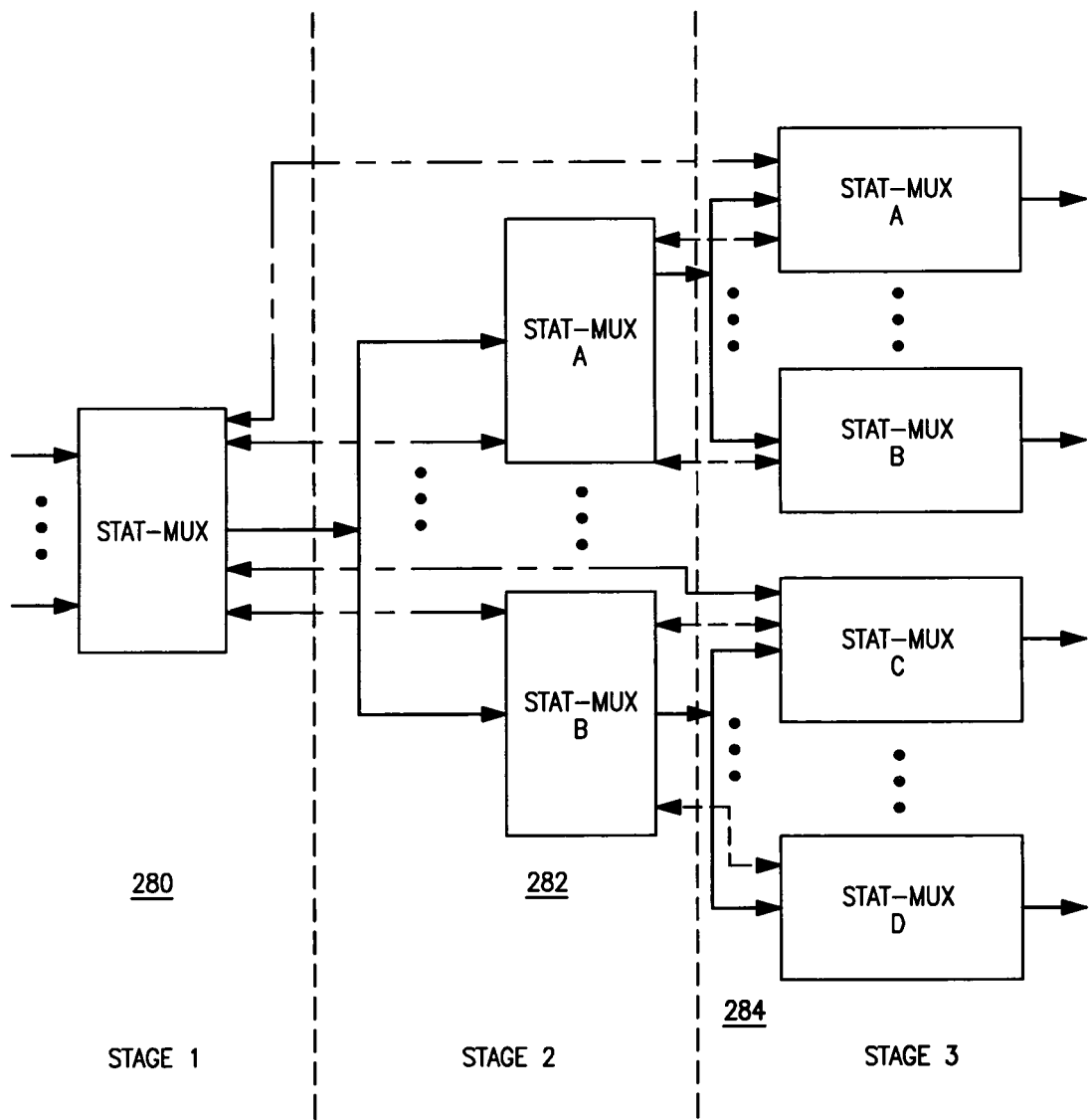
FIG. 2c is a functional block diagram illustrating another exemplary embodiment of the multi-stage content distribution system according to the invention, utilizing three multiplexing stages.

Referring now to FIGS. 2-2c, exemplary embodiments of the statistical multiplexing methods and subsystem according to the present invention are described in detail.

As shown in FIG. 2, the exemplary embodiment of the statistical multiplexing method 200 according to the present invention ("feed-back" variant) comprises first receiving a plurality of content elements (e.g., programs $P_1 \ldots P_n$) at a first or upstream statistical multiplexing process (step 202). This first process also receives information (described in detail below) from one or more downstream stages (step 204) relating to actions to be taken at those downstream stages (e.g., content to be inserted, programs to be removed, etc.). The first stage multiplexes the content elements together (step 206), with the multiplexing process being conducted based at least in part on the information received from the downstream stages. This multiplexed stream is then transmitted downstream to the later stages (step 208), where the content insertion/replacement takes place (step 210). This modified or "amended" multiplex is then transmitted further downstream (step 212), such as to a customer's premises.

FIG. 2a is a functional block diagram of a statistical multiplexing subsystem 220 according to the invention in the context of a video transport network. It will be appreciated that while shown and described in a functional block diagram context, the various components of the subsystem 220 may comprise software processes (e.g., distributed applications or the like), firmware, hardware, or any combination of the foregoing. Hence, the exemplary configurations of FIGS. 2a and 2c are logical in nature only, and not determinative of any particular implementation.

In the illustrated subsystem 220, two-stage multiplexing is performed on digital video programs or other such content. The first multiplexing stage aggregates a number of content elements (e.g., programs) P1 through P5 221 using a statistical multiplexer ("stat-mux") 222 in a multiplexed stream 226. This multiplexed stream is transported to a number of second multiplexer stages. In FIG. 2a, four (4) second multiplexer stages 230, 232, 234 and 236 are shown each with its own output program multiplex 240, 242, 244 and 246, respectively, wherein some content elements (e.g., programs) from the stream 226 are removed. It will be appreciated that any number of first-stage and second-stage multiplexers can be used consistent with the invention, the illustrated embodiment being merely illustrative of the broader principles.

Each second stage stat-mux 230, 232, 234 and 236 is communicatively coupled with the first stage stat-mux 222 via a data connection 228. Depending on the physical configuration, locations, and desired attributes of the various system components, such data connection might comprise, e.g., a direct hardwired data interface, a packetized protocol interface (such as via a conventional Ethernet, USB, IEEE-1394, or similar interface), a wireless interface (such as 802.11, UWB, 3G/UMTS, WiMAX, millimeter wave, satellite, etc.), optical fiber interface, and so forth. In one alternate embodiment, the communication is achieved via off-line communication means such as human operator typing or loading information at a headend or hub. Myriad different configurations for effectively communicating data between the various stat-mux entities of the subsystem 200 will be recognized by those of ordinary skill provided the present disclosure.

An example of how temporal statistical information about a stream obtained at one stage can be used to improve multiplexing performance at another stage is illustrated in the bitrate graph of FIG. 2b. The X-axis or abscissa 252 in this Figure represents time progression (e.g., in units of milliseconds, or in video frame sequence number). The Y-axis or ordinate 250 represents a measure of instantaneous bitrate used for coding a particular content element or program. The first trace 258 represents instantaneous bitrate required to encode an exemplary program PI of the input multiplex 221, using a prior-art stat-mux technique to meet a given video quality objective (e.g., PNSR). The time line (X-axis 252) is split into five periods T1, T2, T3, T4 and T5 labeled 260, 262, 264, 266 and 268 respectively. As can be seen from the graph of the first line 258, the bitrate required to encode P1 is relatively constant through time period T1 and T2, is slightly lower in T3 and goes up to a slightly higher value in periods T4 and T5.

FIG. 2b also shows a similar bitrate requirement graph trace 254 for a second program PA1, representing a replacement program that will be inserted in place of the original program P1 at the second or downstream stage multiplexer 230. The replacement program requires relatively low bitrates during periods T1, T2 and T4. Since the bitrate required by the replacement program is in fact lower than the bitrate taken by the program P1 that will be dropped, second stage multiplexing in T1, T2 and T4 time periods can be relatively straightforward. However, the graph shows that instantaneous bandwidth requirement of the replacement program to maintain visual quality spikes up to a comparatively higher value during period T3 and is also higher in period T5 than the value of the original program P1.

A third trace 256 is shown in FIG. 2b, representing how an exemplary embodiment of a "bandwidth shaping" algorithm according to the present invention can take the increased need for replacement program bandwidth in period T3 into account, and produce an actual compression stream (P1_actual) 270 for program P1. In this illustration, the first stage multiplexer 222 increases bits allocated to program P1 in time interval T3 by taking a small amount of bandwidth away from the program in periods T1 and T2, based on e.g., data fed back to the first stage from the second stage as to the type and parameters of the replacement program to be inserted. This "reserved" bandwidth in the original multiplex can then be used by the replacement program to improve the quality of the replacement program in the outgoing stream (as compared to what such quality would be without the extra bandwidth granted in T3 by the present invention).

It will be appreciated that the foregoing control of the bandwidth or other parameters may be conducted using any number of schemes, including for example on an effectively instantaneous albeit somewhat latent basis (e.g., based on an essentially constant stream of data), on a periodic basis (e.g., once per period of time or number of frames), on a statistical basis (e.g., based on statistics generated previously or during the bandwidth shaping operations), or combinations thereof. In particular, one embodiment of the invention utilizes the feed-back information at the first multiplexer stage to account for the latency in bandwidth demand between the stages.

The statistical information about programs or content exchanged between the stat-muxing stages can include information such as picture rate timing, macroblock/slice rate timing, scene change detection, 3:2 pulldown sequencing information, field/frame compression mode, picture quality information (peak-signal-to-noise ratio or PSNR), etc. Feedback information may also comprise information such as number of advertisements or other content elements to be inserted (and hence the number of programs in the original multiplex to be replaced where the inserted content is inserted in place of existing program content), the starting and stopping times of the insertions (or duration, such as being referenced to an SI clock of other indicia, or as measured in a number of frames), and the like. Such information can be generated a priori (e.g., such as before any statistical multiplexing or other such processing is applied to the content) or a posteriori (e.g., such as after statistical multiplexing or other processing is applied).

Capability information exchanged between the various multiplexing stages can include for example information regarding which parameters are important to a certain multiplexing implementation, how often any quantization/rate changing applied to the content (e.g., once every macroblock, once every slice, once every frame, and so on), bandwidth and end-to-end delay for communicating the messages, etc.

It will also be appreciated that the aforementioned "statistical" or capability information may also be transmitted in the form of metadata of the type well known in the networking arts. For example, in one variant, a generalized (standardized)

syntax is used to promote interoperability between the components/processes of various service providers. Alternatively, a proprietary syntax may be utilized for all or part of the data, thereby assuring interoperability only between equipment and processes of one system operator. This data can also be protected using any number of well known security techniques, including security mechanisms within the physical or link layers of the indigenous transport channel used to carry the data, session layer security, IPSec or VPN tunneling, application layer encryption, and so forth.

The above example of FIG. 2b merely illustrates one exemplary embodiment of the present invention, wherein feedback from a downstream (subsequent) stage in a signal path is used as at least a partial basis for controlling the multiplexing/encoding performed at a prior stage of the stat-mux process. As will be recognized by those of ordinary skill, the exact details of the time variation of bitrates and values in each time interval are not critical to the invention, and may be implemented in literally any fashion desired.

Additionally, as shown by the dotted lines used to represent the data connections 208 between the first- and second-stage stat-muxes in FIG. 2a, the inter-stage data communications may be selectively applied to all or only a subset of the second stage stat-mux processes 230, 232, 234, 236, such as where the first stage stat-mux 222 selectively masks, filters, or tunes out the data from one or more of the second-stage stat-mux processes under certain circumstances. For example, where only one of the second-stage processes 230, 232, 234, 236 is going to conduct replacement program insertion during a given period of time, there may be no need to maintain a data channel 228 to the other (non-inserting) processes. Similarly, the adjustment process (e.g., bandwidth shaping algorithm) may only require or desire input from a subset of the downstream stages, irrespective of whether those stages are inserting replacement content.

In one exemplary configuration, the headend or first stage multiplexing process 222 is also optionally configured to evaluate the effect of the prospective insertions to be carried out by the downstream nodes (e.g., hubs 104) in order to determine the impact on program quality for the non-inserted programs/streams. For example, if the number/quality requirements of downstream insertions is such that a significant impact on the quality of the non-inserted content will be realized, then the headend process 222 may selectively restrict or "throttle" changes it makes in terms of allocated bandwidth (e.g., by limiting the magnitude or rate shaping occurring within a given period of time), and/or restrict the ability of one or more downstream nodes to make the prospective insertions/replacements.

In another exemplary embodiment, more than two multiplexer stages (FIG. 2c) may be used consistent with the invention. In this approach, first, second, and at least third stages 280, 282, 284 of multiplexers are employed to allow a progressive or step-wise approach to bandwidth shaping and multiplexing. For example, in one variant, the multiplexers of the third stage 284 feed information back to the second stage 282, with the latter optionally feeding information back to the first stage 280. Specifically, it is noted that data or information generated by the third stage 284 may be processed or utilized by the second stage 282 in a manner which is different from how the first stage 280 might use that information. The second stage may perform insertion or not; e.g., it may insert all types of content, only certain types of replacement content, or none at all. This can be heterogeneous with the capabilities of the third stage 284. Accordingly, the feed-back information used by the second stage 282 may differ in quality or character as compared to any such information which is (optionally) fed back to the first stage 280. Stated differently, factors such as the nature of the content being inserted, its bandwidth requirements, and so forth for one stage may be different for another stage, and hence the present invention contemplates a heterogeneous environment wherein the statistical multiplexing controls or adjustments implemented at one stage may different from those implemented at another stage.

It will be appreciated that such a multi-stage approach may be conducted in a completely decoupled fashion (e.g., wherein the data fed back from the third stage 284 to the second stage 282 is effectively independent of what is fed back from the second stage 282 to the first stage 280, and hence the bandwidth shaping algorithms for the various stages may operate substantially independent of one another), or alternatively in a coupled fashion (i.e., the data or control information fed back to the first stage 280 is predicated or derived at least in part from that sent back from the third stage 284). Such coupled operation may be performed serially; e.g., such as where the data/commands fed back to the first stage 280 must necessarily occur after the receipt (and analysis) at the second stage 282 of data from the third stage 284. Alternatively, the coupled process may occur in a statistical or averaged fashion, such as where data obtained by the second stage 282 from the third stage 284 over time is used to form periodic transmissions of control or other data to the first stage 280, irrespective of any temporal or logical relationship between the two data sets. Myriad other approaches will be recognized by those of ordinary skill.

As yet another alternative, the data from the third stage may selectively "bypass" the second stage 282 and be routed directly to the first stage multiplexer 280. In this approach, the second stage multiplexing process is substantially transparent to the other stages 280, 284.

It will further be recognized that the present invention may be implemented in the context of a "feed-forward" configuration, wherein information relating to the statistical multiplexing process (or related data) can be fed forward from an earlier or upstream stage to a later or downstream stage. For example, in one embodiment, the first stage stat-mux 222 of FIG. 2a can generate data (e.g., bitrate characteristics or the like) relating to the original program content P1-P5, or the resulting multiplexed stream, and feed this information downstream to all or a subset of the second stage muxes in order to provide anticipatory control/insertion at the second stage muxes. In one variant, the feed-forward information is used to shape or control the bandwidth of the inserted content, thereby allowing the content-insertion process to adjust to the program bandwidth requirements at the ingress to the first stage multiplexer 222. As before, this shaping or control can be applied (almost) instantaneously, statistically, periodically, or in any other such fashion as desired in order to provide the desired level/characteristics of control and granularity.

As yet another option, time- or event-modulated, or even near-contemporaneous feed-back and feed-forward statistical multiplexing may be utilized. For example, in one variant, the fed-back and feed-forward processes may be selectively employed based on one or more selection criteria such as, e.g., the availability of bandwidth shaping at the first or second stage muxes. When the first stage mux does not have the capability (or otherwise does not desire to impose bandwidth shaping at a given point in time for other reasons), the feed-forward approach may be invoked in order to impose shaping of the inserted content. The converse may also be true; i.e., a feed-back approach is invoked where feed-forward is impossible or undesirable. As another alternative, feed-back or feed-forward shaping may be applied only upon the occurrence of certain events such as during certain periods of time, the use of particular services, or the creation of sessions (e.g., OD sessions) by one or more users served by a given hub, and so forth.

It is also anticipated that there will be situations where the feed-back and feed-forward approaches can be used in tandem; e.g., where rate shaping at the first stage and shaping of the inserted content at the second stage are used concurrently in order to meet one or more system goals such as conservation of bandwidth on a system-wide basis. However, care must be taken to avoid situations where an "open" control cycle is created due to latency inherent in the system, wherein changes in one stage precipitate a corresponding adjustment in another stage, which generates feed-back causing another change in the first stage, and so forth. Accordingly, in one approach, the duration of the interval between changes in either stage is controlled by the system logic so as to avoid too rapid a response to feed-back/feed-forward situations, thereby allowing the system to "settle" before additional changes or adjustments are permitted. It will be recognized that other approaches for preventing such open-loop conditions may be used as well, such approaches being well known to those of ordinary skill in the control system arts.

It will also be appreciated that the second or "downstream" stage multiplexers can serve multiple master first stages if desired. For example, in one variant of the invention, the first stage statistical multiplexing process comprises two or more individual multiplexing processes; such as where two headend multiplexers are disposed within respective ones of different distribution networks. The two (or more) upstream processes are tied to one or more of the hubs 104, with the hub using the downstream multiplexes from each upstream stage on a shared (e.g., time-divided, multiplexed, or switched basis). Accordingly, the feed-back information can be passed from that hub to both of the upstream processes such that each of the latter may adjust its operation as previously described herein in response to content to be inserted at the hub 104. Such adjustment by the upstream processes may also be on a time-divided, multiplexed or switched basis.

In one exemplary variant of the invention, existing statistical multiplexing and communications hardware/software present in the distribution network is utilized as the basis of the enhanced communication and multiplexing capabilities described herein. For example, the data relevant to the aforementioned statistical multiplexing communications between the stages (e.g., feed-back or feed-forward) can be packaged or encapsulated within existing networking protocols such as RCP/RTCP, SIP, or the like, thereby obviating the requirement for significant changes to the existing infrastructure. In many cases, the implementation of the current invention can be accomplished merely through modification of a portion of the protocol stack(s) within the headend and hub statistical multiplexing software processes, and completely above the physical layers of the network. Hence, the exemplary embodiments of the present invention are advantageously independent of or agnostic to the lower layers of the bearer medium, thereby adding significant flexibility in terms of rapid and cost-effective implementation in existing networks.

In another embodiment of the invention, the downstream (i.e., feed-forward) information sent from one stage to another is sent via an in-band transport stream, such as via the equivalent of SI packets encoded and multiplexed into the stream at the headend process. These packets are then identified at the hub 104, extracted from the transport stream, decoded, with the decoded payload being used for rate shaping or similar functions as previously described herein.

Similarly, it will be appreciated that the feed-back information may utilize an existing out-of-band (OOB) or similar channel in order to provide communications between the hub(s) 104 and the headend process 101.

Headend Multiplexing—

The multiplexing functions performed at an upstream location in the network (e.g., the headend 101 of FIG. 1) according to one exemplary embodiment of the present invention are now explained in detail. It will be appreciated that while a feed-back arrangement is described, the various aspects of the headend processing may be readily adapted by those of ordinary skill for feed-forward operation, and/or multi-staged operation, as previously described herein.

Figure 3:
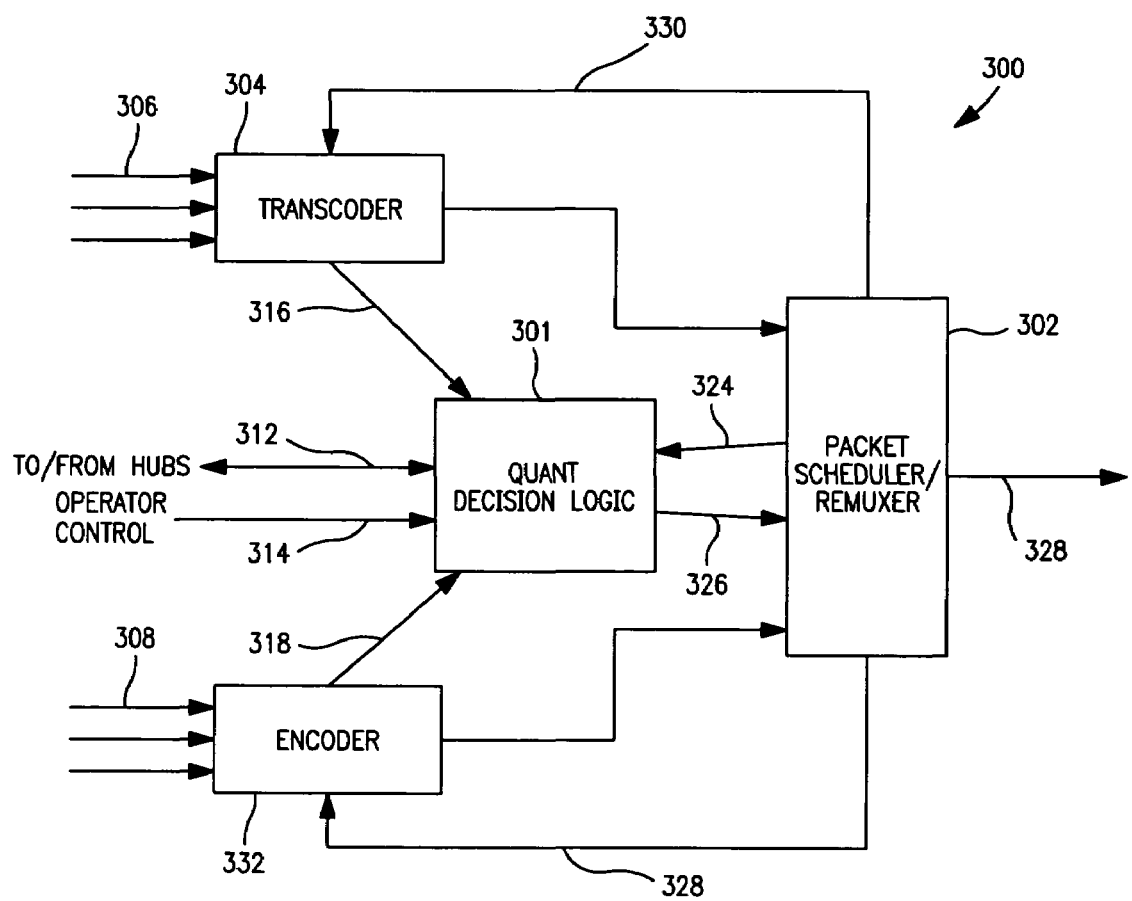
FIG. 3 is a functional block diagram of an exemplary configuration of a first (e.g., headend) multiplexer stage according to the invention.

The various functional elements of the headend multiplexing system 300 are shown in FIG. 3. It should be noted that the illustrated configuration is a functional block diagram, with no suggestion or requirement that certain functions described below should or must be implemented in any particular manner or implementation. Hence, various configurations are possible that implement the functionality in hardware, firmware, software, or combinations thereof (such as, e.g., the "layered" software approach previously described). Such configurations may have elements that are spatially localized, or alternatively distributed over two or more locations as well.

In a conventional digital cable network, the headend 101 typically performs the function of content aggregation for sending the content downstream to various hubs 104 in the cable network (see FIG. 1). The content is aggregated using multiplexes of the individual program or other content elements. The total bandwidth occupied by a multiplex is commensurate with the bandwidth available on a 6 MHz QAM channel on which that particular multiplex is modulated when sent on the coaxial portion of the network.

The programming available at the headend 101 for such aggregation is either in uncompressed format (e.g., local channels as over the air transmission) or pre-compressed format (e.g., pre-compressed digital programs from a local content servers or from satellite feeds 161 via e.g., a demodulator and decryptor 163 as show in FIG. 1b herein). Accordingly, the programs are either encoded or transcoded to fit within a given digital multiplex.

Referring again to FIG. 3, the processing performed to create an Original Program Multiplex (OPM) 328 can be described as follows. Programs available in the compressed format 306 are transcoded, for example using statistical multiplexing techniques, under the control of a Packet Scheduler/Remultiplexer (PSR) function 302. The PSR allocates instantaneous bandwidth available to each program and conveys that information via a control signal 330 to the transcoder 304. Conventionally, the transcoding function is also called requantizer or rate shaper. Programs that are available in an analog or un-compressed format 308 are encoded (compressed) under the control of the PSR function. Based on various parameters such as the instantaneous bandwidth available and quality of quantized video, the PSR function provides feed-back to the encoder 332 regarding instantaneous bits available to encode each program into the OPM signal 328. Additionally, a Quantization Decision Logic (QDL) function 301 aids the PSR with bit allocation functionality for various programs being aggregated in the OPM.

The primary function of the QDL 301 is, via a signal interface 326 between the QDL and PSR, to fine tune the instantaneous bit allocated by the PSR 302 to each program in the Original Program Multiplex by taking into consideration feed-back regarding downstream program insertion that it receives from the hubs 104 via an interface 312, any additional network operator settings 314, quality feed-back from the transcoder for programs being transcoded 316, quality feed-back from the encoder for programs being encoded 318, and feed-back from the PSR 324.

In various embodiments, the feed-back received from the hubs 104 via the interface 312 (or other interface not shown) can include information regarding, inter alia (i) which program from the OPM is being removed at that hub; (ii) the start and/or end time of removal; (iii) content statistics for the replacement program that is (or will be) inserted; (iv) scene changes in the replacement program, and so forth. In a typical deployment, one headend 101 will provide aggregated programming to several hubs 104, although other arrangements (such as a one-to-one, or even a many-to-one configuration) may be utilized.

Certain types of feed-back from a hub 104 may tend to cause the QDL 301 request to increase the instantaneous bitrate of an outgoing program (e.g., an upcoming scene change in the replacement material at the hub). Other types of feed-back may result in a reduction in the instantaneous bitrate for the outgoing program (e.g., all or a portion of the replacement material has faded to black). The QDL 301 also has the additional function of reconciling feed-back from various hub locations. The network operator may want to provide certain settings or algorithms to enable the QDL to weight and/or prioritize use (or the magnitude or type of effect) associated with feed-back from multiple hub locations on the instantaneous bitrates of outgoing streams. Such functionality may be implemented, e.g., in the form of algorithms based on weighting or prioritization equations, and configured and modified via a graphical interface to the multiplexing device. This functionality may also be imposed according to a rules or similar engine, wherein the weighting and/or prioritization is varied as a function of time of day, destination of the multiplex (e.g., geographic area), profile of the users being served by the multiplex, and so forth.

In some implementations, the bitrate decision may take into account how many hub locations at which a program will be removed. For example, if a program of the OMP 328 is scheduled to be replaced at a significant number of hubs, the relative visual quality of that program may be de-emphasized in favor of other programs that are not being (so widely) replaced. Alternatively, the headend 101 may check for the relative priority of the replacement material. For example, if a replacement program at one hub 104 is deemed to have a higher priority than a replacement program at another hub, the feed-back from the higher priority replacement hub may be given more weight during the headend multiplexing process. Various embodiments of such priorities are envisioned under the present invention, including for example a number scale (e.g. a 1-to-10 rating system), binary priorities or fuzzy logic variables (e.g., "high", "low") or priority tiers (e.g., high, medium, low, "don't care"). Feed-back from the hubs 104 can also include quality-based or similar feed-back regarding programs that are not being replaced, but perhaps being rate-changed by the hub multiplexer.

Under the exemplary embodiment of the invention, other network operator settings may be imposed including, without limitation, maximum and minimum rate variations allowed for each program, visual quality metrics to be met on each program in the OMP, and so on. These settings may also take the form of profiles, wherein a coordinated set of settings and logical functions adapted for particular commonly encountered circumstances are selectively implemented by the network operator. For example, a typical profile according to the invention might comprise specification of certain rate variations imposed on a program or time of day basis, along with a prioritization scheme and rules engine-based controls adapted to maximize economic attributes such as revenue. As can be appreciated, such profiles may be rapidly switched in or out, and can also be modified ("tweaked") on the fly by the operators if desired.

The transcoder quality feed-back 324 shown in FIG. 3 provides the QDL information regarding outcome of the bit allocation performed by the PSR 302, and also any measure of the visual quality of the outcome (e.g., Peak Signal to Noise Ratio or PSNR of each program in the OPM 328).

Information provided by the encoder and transcoder functions 332, 304 to the QDL 301 can include information regarding scene changes, frame coding sequence (e.g., I, P, B frame encoding of the MPEG-2 format) that might be of interest to both the headend multiplexing and downstream hub multiplexers. Other parameters might include for example average motion vector length (indicates fast or slow motion), quantization per macroblock (average or weighted), and/or bits per macroblock (average or weighted).

Hub Multiplexing—

Figure 4:
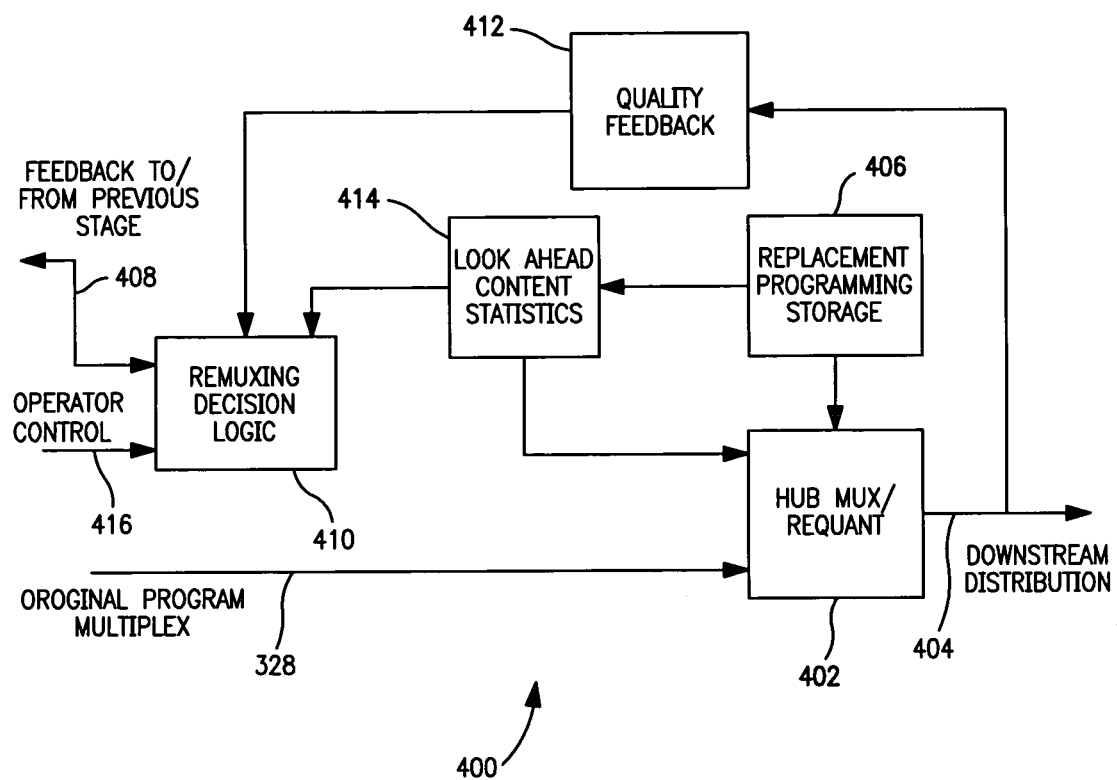
FIG. 4 is a functional block diagram of an exemplary configuration of a second (e.g., network or hub) multiplexer stage according to the invention.

Referring now to FIG. 4, an exemplary embodiment of the multiplexing function 400 at a hub 104 is described in detail. As shown in FIG. 4, the hub function 400 comprises a multiplexing and requantization (HMR) process 402 that receives the OPM 402 from the headend 101 (or other intermediate node) to produce a modified program multiplex (MPM) 404 for downstream distribution. The HMR process 402 optionally replaces one or more programs or content elements (e.g., advertisements or promotions) of the OPM 328 by inserting replacement programs(s) from a locally available program/content element, the latter typically stored on a storage device such as hard drive or a tape machine 406, or alternatively transiently stored in a buffer arrangement after receipt from a third party source (such as a content "pull" from a third party vendor over the Internet or other delivery mode). Such insertion may be performed either by transcoding or encoding the replacement content, depending on the format in which the replacement program is stored or provided.

In certain implementations, a "look-ahead" function 414 can also optionally be utilized to provide temporal or other statistics of the replacement content to a headend mux feed-back function 410 implemented at the hub 104 in order to provide feed-back 408 to an upstream multiplexing function (e.g., that at the headend 101). The look-ahead function 414 is also useful to the local multiplexer/re-quantizer (HMR) 402 in creating the local MPM 404 for downstream distribution. Since the look-ahead function is communicatively coupled with the headend multiplexer process, it receives temporal statistics and information about programs/content in the OPM 328 that will be useful for the HMR 402. Pre-processing of content to be inserted can also be conducted before delivery of the content to the hub 104 (or at the hub upon receipt, in advance of its insertion).

To enable monitoring of program quality on the outgoing MPM 404 and adjustment of the level of multiplexing and quantization, a quality feed-back function 412 can also optionally be used. This process 412 provides, inter alia, program quality monitoring that can be used by the headend mux feed-back logic 410 in developing feed-back ultimately sent to the upstream multiplexing node(s).

In the illustrated embodiment, an input 416 is also optionally provided to the multiplexing decision logic 410 that communicates the network operator's control settings to the statistical multiplexing process at the hub 104. The control provided by the network operator's settings or profiles on multiplexing at the hub(s) 104 can be substantially similar to the headend multiplexing controls described previously herein, or may be more specifically tailored to the operating environment of that particular hub (e.g., to take into account the particular configuration, geography, and/or customer base within the area served by that hub 104).

Delayed and Switched Digital Variants—

In another aspect of the invention, a uniform delay is optionally introduced between upstream and downstream stages (e.g., the headend and hub multiplexer stages previously described herein). Specifically, one exemplary embodiment of the invention (see FIG. 5) applies this delay 501 uniformly to the aggregate multiplex bitstream 504 generated by the first multiplexing stage 502, and to all program streams 506 that may need to be added to the multiplex. The purpose of this time delay is to, from the viewpoint of the second or downstream stage 508, provide "future looking" data about the bitrate requirements or other parameters of the streams in the multiplex with an additional or substituted stream. Advantageously, this future looking data (as well as data by which the second stage can determine the timing or magnitude of the delay) 510 is provided prior to the act of adding or substituting the new stream 512. The data is "fed forward" from the first or upstream stage to the second (or other downstream) stage without any purposefully introduced delay (or a delay which is less than the delay of the multiplex), thereby becoming available to the downstream stage prior to the availability of the content stream(s) with which it is associated. Such an approach allows the downstream stage(s) to improve the quality of all rate shaping decisions, thereby enhancing picture quality (or otherwise preventing or mitigating any degradation) in one or more streams that would otherwise be unavoidable without the availability of this future looking data.

The aforementioned delay can be implemented using any number of techniques, including for example buffering the first stage multiplex output in a suitably sized FIFO or comparable buffer structure. The buffer can be arranged to provide a user-variable delay, such as where an oversized buffer is used with a variable high-water mark, the latter triggering output of the stream. Hence, by varying the high-water mark relative to the buffer capacity (e.g., via a software user interface or other such mechanism), the latency or delay imposed on the data is varied as desired. Myriad other approaches to providing such a uniform delay may also be employed consistent with the invention, such other approaches being readily apparent to those of ordinary skill provided the present disclosure. It will be appreciated that this delay may be measured or imposed as a function of time (e.g., seconds) or another metric, such as a number of frames or other such occurrences.

Figure 5:
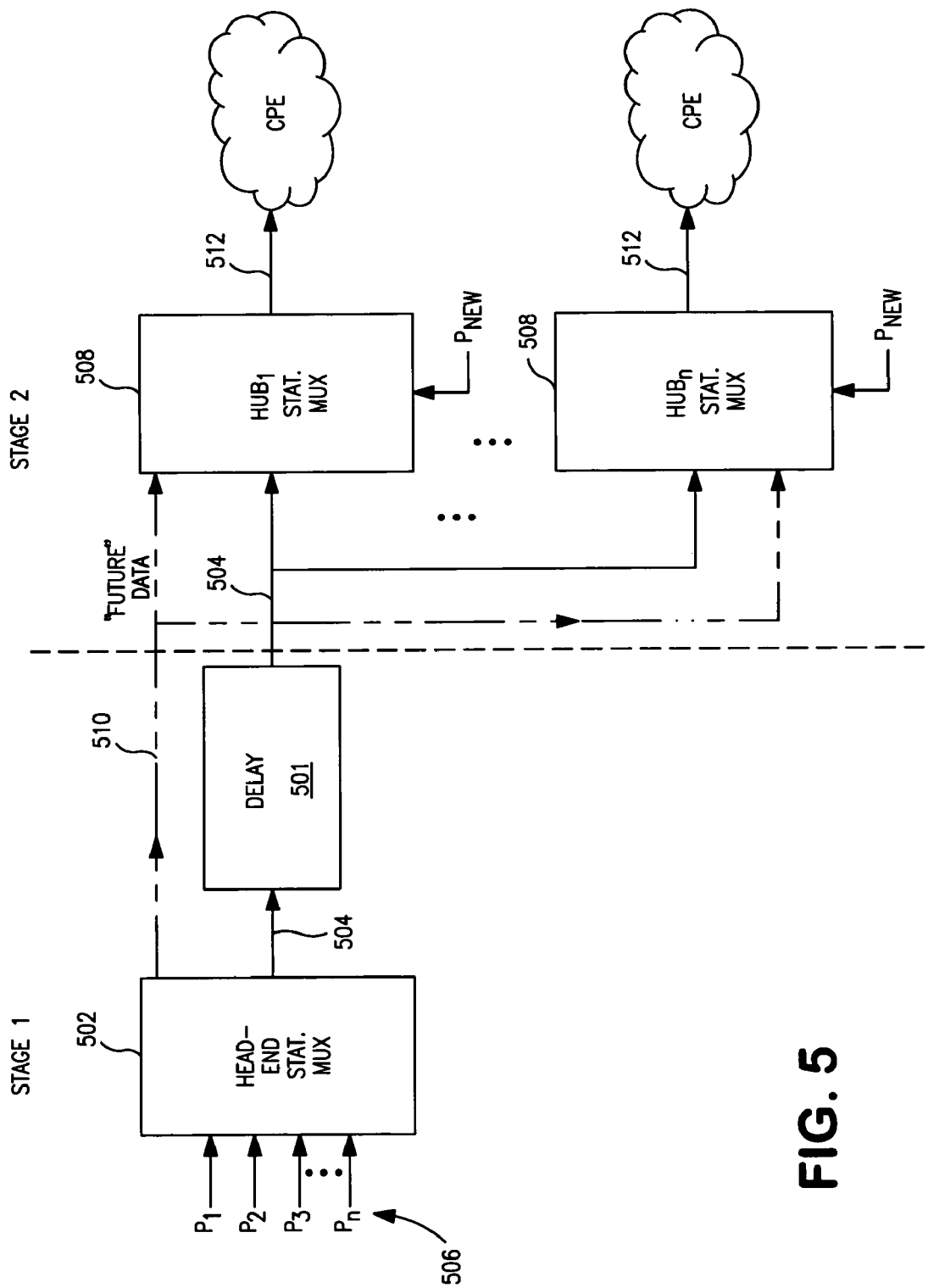
FIG. 5 is a functional block diagram of an exemplary configuration of a multi-stage multiplexed delivery system according to the invention, wherein a delay is imposed to permit the use of "future looking" feed-forward data.

While shown as a separate entity 501 in FIG. 5, the delay function may be incorporated within the headend multiplexing process 502, the second stage mux processes 508, or any other logical or physical location desired.

The use of the aforementioned delay also provides opportunities for control of the distributed content by the MSO or another entity. For example, in one variant of the invention, stream substitution facilitated by the aforementioned delay mechanism is applied to ordinary program or content streams based on stream requests that are made through various CPE. For example, an on-demand or similar request from a user's CPE is used to instantiate a program stream for delivery to a given hub 104 or other network distribution node according to a "switched digital" paradigm. For example, co-owned and co-pending U.S. patent application Ser. No. 09/956,688 filed Sep. 20, 2001 and entitled "Technique For Effectively Providing Program Material In A Cable Television System", incorporated herein by reference in its entirety, describes one exemplary switched architecture useful with the present invention. The basic underlying premise of such switched architectures is that the differentiated (e.g., HD or OD) content is not transmitted or broadcast onto the network (or to the local node or entity servicing a given CPE 110) until there is a valid request to view that content. Such request may comprise, for example, a given user's CPE taking a specific action (e.g. tuning to a user channel carrying the desired content, or transmitting an upstream request signal). In this fashion, the bandwidth of the network is conserved, since programming broadcasts or transmissions that no one is watching are obviated.

The aforementioned optional delay feature of the present invention advantageously allows switched digital systems to enjoy the advantages of statistical multiplexing heretofore not possible due to the real-time nature of the switched programming. Stated differently, existing switched digital paradigms utilize real-time programming, thereby making the insertion of statistically multiplexed content effectively impossible. Furthermore, the need to maintain reasonable and user-friendly switching (channel change) performance imposes additional constraints on the application of multiplexing to switched digital systems.

However, by delaying the program delivery to the hub (second stage) by a given amount as in the present invention, the opportunity to receive user-initiated requests and transparently service them through insertion of the requested content, and apply statistical multiplexing, is created. Specifically, in one embodiment of the invention, a computer program or comparable mechanism is utilized at the second or downstream stage of the network (e.g., at the local hub 104), whereby future-looking bitrate parameters (and optionally other parameters of the type described elsewhere herein) of the available programs are evaluated, and rate-shaping parameters for possible combinations of these programs calculated on a speculative basis. In one variant, the rate-shaping parameters are calculated for all possible combinations of programs. In another variant, a "bounding" or corner-case analysis is performed, whereby only the worst-case or bounding conditions are determined. Yet other speculative analytical approaches known to those of ordinary skill in the art may be used as well. This approach of speculative evaluation allows CPE program stream additions and/or substitutions to be executed within a reasonable time after the request is issued by the CPE 110, while at the same time facilitating efficient statistical multiplexing operation.

It will also be appreciated that the delay imposed by the upstream multiplexing stage may be varied programmatically or according to other schema. For example, it may be desirable to use a larger or smaller delay value during certain operating conditions, such as increased/decreased session or content demand at the individual second-stage hubs. This demand may be determined anecdotally or empirically (such as via data accumulated at the hubs and fed back to the headend multiplexer stage), or via observed or a priori relationships, such as where it is known that demand increases at certain times of day and/or in certain geographical areas.

Wideband and Multi-QAM Variants—

While the foregoing embodiments of the present invention are described primarily in terms of an infrastructure adapted to transmit content over a single physical channel (e.g., 256-QAM modulated carrier) at any given time, it will be recognized that this "physical channel" may actually comprise one or more distinct carriers. For example, in one multi-carrier variant of the invention, the content is streamed over multiple physical carriers according to a multiplexing algorithm such as that described in co-owned and co-pending U.S. patent application Ser. No. 11/013,671 filed Dec. 15, 2004 and entitled "Method And Apparatus For Wideband Distribution Of Content", incorporated herein by reference in its entirety. Under this approach, the data of a given transport stream can be multiplexed across a plurality of physical carriers, with the multiplexed signal being reassembled at the CPE 106 using a wideband tuner (or a plurality of related tuners). Information from the headend as to the multiplexing scheme and channels used may be provided to the CPE (and intermediate nodes such as the network hubs 104 if desired) in order to enable de-multiplexing (and decoding) of the multiplexed transport stream. Hence, for the purposes of the present invention, the aggregation of multiplexed channels acts like a single QAM. This is particularly useful in the context of the present invention which, as previously described, is substantially independent of any physical layers or underlying bearer medium. Hence, one variant of the present invention in effect constitutes a statistical multiplex layered on top of a wideband "physical" multiplex.

Business Methods—

It will be readily appreciated that various aspects of the present invention lend themselves to the creation of new business models, wherein network operators, content and advertisement providers, or other entities can provide or be provided differentiation in the type or quality of service via the interaction of the various network multiplexing elements and processes.

For example, in one exemplary business model of the invention, the network operator can assure maintenance of the quality of a certain program by insulating it from transcoding/replacement within a given multiplex (or at other multiplexes) that could potentially reduce its quality. This can be applied on a network-wide or per-hub basis as desired, for example by simply designating hubs (e.g., via their addresses or some other mechanism) which should or should not allow replacement or insertion to occur against the designated content. This protection can also be applied on a temporal or per-user channel basis; e.g., during certain periods of the programming day or on certain user channels (or physical channels for that matter), the program quality or other metric may be insulated from degradation due to bitrate/bandwidth shaping from downstream multiplexing processes. For example, it may be desirable to maintain zero loss of quality rules during certain periods of transmission of standard definition (SD) or high definition (HD) programming.

Similarly, premium "tiered" advertisement service can be offered that maintains the quality or other metric of the advertisement by, e.g., using feed-back regarding the bitrate requirement of that advertisement to rate-shape the OPM 328. This can also be applied on a per-hub, per-occurrence, and/or per-channel basis if desired, such as where (i) the advertisement quality is maintained only for one hub; (ii) the advertisement quality is maintained only for one or selected occurrences of insertion of the advertisement; and/or (iii) the advertisement quality is maintained only for one or selected user or physical channels.

Furthermore, a "business rules" engine such as one generally of the type described in co-owned and co-pending U.S. patent application Ser. No. 10/881,979 filed Jun. 29, 2004 previously incorporated herein can be used, although other approaches and configurations may be used with equal success. Such an engine might comprise one or more software processes running coincident with the aforementioned statistical multiplexing processes and adapted to control the upstream and/or downstream statistical multiplexing processes in order to impose various business-related rules to, e.g., maximize profit, increase user-satisfaction, provide selective promotions or other premium services within select geographic areas, etc.

Additionally, it will be recognized that the aforementioned delay-based and "switched digital" configurations of the present invention may form the basis of yet other business models. Specifically, the ability to provide the customer with statistically multiplexed (rate shaped) program content in the switched digital context is a significant business consideration. As previously noted, the switched digital approach advantageously reduces local network bandwidth requirements by instantiating sessions or content delivery only upon the existence of a viable request, and the statistical multiplexing approach of the present invention provides the ability to efficiently deliver the requested content without degradation of the quality or timeliness thereof.

Additionally, the aforesaid business models relating to the insertion of advertising or promotional content can be extended to the switched digital context, since the use of the delay as described above enables the use of statistical multiplexing (and hence future-looking feed-forward data) in this context. For example, where a user requests a given content element (e.g., program) via a session request, by tuning to a given user channel, or the like, the local node 104 can be programmed to insert corresponding advertising or promotional content (whether logically related to the requested content or otherwise), the insertion of the advertising/promotional content and the requested program itself being controlled at least in part by using the anticipatory statistical multiplexing data generated by the headend 101. The MSO can therefore, e.g., sell advertising or promotional space on an ad hoc basis, without affecting the quality of the user-requested content (or of the advertising or promotional material).

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A headend multiplexing apparatus adapted for the transmission of a plurality of content elements over a cable network, comprising:

first multiplexing apparatus adapted to receive said plurality of content elements from one or more sources, and create at least one output multiplex based thereon;

a process in communication with said first multiplexing apparatus and adapted to control at least one aspect of said first multiplexing apparatus in the creation of said output multiplex; and a data interface adapted to communicate data between said headend multiplexing apparatus and a second multiplexing apparatus within said network, said data comprising information which allows for the control of individual bitrates of said plurality of content elements by at least one of said first and second multiplexing apparatuses;

wherein said control of said at least one aspect of said first multiplexing apparatus comprises utilizing said data, having been received from said second multiplexing apparatus, to anticipate bandwidth shaping in the creation of said output multiplex.

2. The headend multiplexing apparatus of claim 1, wherein said data further comprises information relating to at least one of (i) the insertion or removal of content elements by said second multiplexing apparatus; and (ii) the bandwidth requirements of said first multiplexing apparatus in said creation of said output multiplex.

3. The headend multiplexing apparatus of claim 2, wherein said bandwidth or rate shaping comprises at least a temporary reduction in the bandwidth allocated to at least one of said content elements by said first multiplexing apparatus during a first time period, said temporary reduction providing additional bandwidth to be used by at least one content element inserted into said output multiplex by said second multiplexing apparatus.

4. The headend multiplexing apparatus of claim 3, wherein said additional bandwidth is utilized by said at least one inserted content element during a second time period subsequent to said first time period.

5. The headend multiplexing apparatus of claim 1, wherein said bandwidth or rate shaping comprises at least a temporary reduction in the bandwidth allocated to at least one content element inserted into said output multiplex by said second multiplexing apparatus during a first time period.

6. The headend multiplexing apparatus of claim 1, wherein said first multiplexing apparatus and said process collectively comprise an integrated circuit having software running thereon.

7. The headend multiplexing apparatus of claim 6, wherein said headend multiplexing apparatus comprises a server including said integrated circuit, said server further comprising a first network interface to said one or more sources, and a second interface to said cable network.

8. The headend multiplexing apparatus of claim 1, wherein said headend multiplexing apparatus further comprises a user interface adapted to allow a user to configure at least one aspect of said process.

9. The headend multiplexing apparatus of claim 8, wherein said configuration of said at least one aspect of said process comprises imposing an operational profile onto said process, said operational profile implementing at least one operational constraint and at least one content-related priority rule using said process.

10. The headend multiplexing apparatus of claim 1, wherein said data interface further comprises:

first logic configured to receive first information from said second multiplexing apparatus, said first information being useful for controlling at said process said creation of said output multiplex; and second logic configured to transmit second information regarding said created output multiplex to said second multiplexing apparatus contemporaneously with provision of said created output multiplex.

11. A method of operating a content-based network having a plurality of multiplexing stages, comprising:

receiving a plurality of content elements at a first of said plurality of multiplexing stages;

generating a multiplex based at least in part on said content elements at said first multiplexing stage;

providing, by said first multiplexing stage, said multiplex to a second of said plurality of multiplexing stages, said second multiplexing stage being downstream from said first multiplexing stage, said act of providing comprising introducing a variable delay; and providing, by said first multiplexing stage, data relating to said multiplex and data relating to the timing of said variable delay to said second multiplexing stage.

12. The method of claim 11, wherein said first multiplexing stage is associated with a headend entity of said content-based network, and said second multiplexing stage is associated with a hub entity of said content-based network.

13. The method of claim 12, further comprising providing data relating to another multiplex generated at said second multiplexing stage of said hub entity to said first multiplexing stage of said headend entity; wherein said act of providing data to said second multiplexing stage and said act of providing data to said first multiplexing stage comprises communication via at least one of a feed-back or feed-forward signal.

14. The method of claim 12, wherein said data relating to said multiplex and said data relating to the timing of said variable delay is utilized by said hub entity to configure multiplexing functions of said second multiplexing stage.

15. The method of claim 11, wherein said act of providing data relating to said multiplex and data relating to the timing of said variable delay comprises providing said data relating to said multiplex and said data relating to the timing of said variable delay in advance of said expiration of said variable delay, said data relating to said multiplex and said data relating to the timing of said variable delay providing said second multiplexing stage with anticipatory information regarding said multiplex, said anticipatory information being used by said second multiplexing stage to adjust at least one parameter relating to modification of said multiplex.

16. The method of claim 11, wherein said act of introducing a variable delay comprises at least one of (i) buffering at least a portion of said multiplex before providing said multiplex to said second multiplexing stage; and (ii) introducing a delay on the basis of a temporal parameter.

17. The method of claim 11, wherein said act of providing data relating to said multiplex and data relating to the timing of said variable delay comprises providing data regarding bitrate requirements of said plurality of content elements in said multiplex.

18. The method of claim 17, wherein said second multiplexing stage is operable to:

calculate said bitrate requirements of said plurality of content elements in said first multiplex;

generate a second multiplex, said second multiplex comprising at least one of a second plurality of content elements and said multiplex; and after expiration of said variable delay, transmitting said second multiplex to a remote entity.

19. The method of claim 11, wherein said variable delay is based at least in part on at least one of session or content demand at individual ones of a plurality of hubs of said content-based network.

* * * * *